United States Patent
Nakazawa et al.

(10) Patent No.: US 10,767,890 B2
(45) Date of Patent: Sep. 8, 2020

(54) LOAD OPERATION CONTROL SYSTEM

(71) Applicant: Daikin Industries, LTD., Osaka-shi, Osaka (JP)

(72) Inventors: Yuji Nakazawa, Osaka (JP); Atsushi Sakawaki, Osaka (JP)

(73) Assignee: DAIKIN INDUSTRIES, LTD., Osaka-shi (JP)

( * ) Notice: Subject to any disclaimer, the term of this patent is extended or adjusted under 35 U.S.C. 154(b) by 0 days.

(21) Appl. No.: 16/609,085

(22) PCT Filed: May 8, 2018

(86) PCT No.: PCT/JP2018/017690
§ 371 (c)(1),
(2) Date: Oct. 28, 2019

(87) PCT Pub. No.: WO2018/207748
PCT Pub. Date: Nov. 15, 2018

(65) Prior Publication Data
US 2020/0096220 A1 Mar. 26, 2020

(30) Foreign Application Priority Data
May 9, 2017 (JP) ................................ 2017-093378

(51) Int. Cl.
*F24F 11/86* (2018.01)
*F04D 27/02* (2006.01)
(Continued)

(52) U.S. Cl.
CPC .............. *F24F 11/86* (2018.01); *F04D 27/02* (2013.01); *F25B 1/053* (2013.01); *F25B 49/025* (2013.01);
(Continued)

(58) Field of Classification Search
CPC ....... F24F 11/86; F24F 11/62; F25B 2400/07; F25B 1/053; F25B 49/025; H02K 7/14;
(Continued)

(56) References Cited

U.S. PATENT DOCUMENTS 9,494,044 B1 * 11/2016 Kloesel .................. F04D 25/00
9,816,517 B2 * 11/2017 Taguchi ................. F04D 25/06
2017/0089276 A1   3/2017 Sunagare et al.

FOREIGN PATENT DOCUMENTS

JP   2001-339979 A   12/2001
JP   2013-127221 A   6/2013
(Continued)

OTHER PUBLICATIONS

International Search Report issued in PCT/JP2018/017690 (PCT/ISA/210), dated Aug. 7, 2018.

*Primary Examiner* — Antony M Paul
(74) *Attorney, Agent, or Firm* — Birch, Stewart, Kolasch & Birch, LLP

(57) ABSTRACT

A drive shaft rotates a load. A drive support rotates the drive shaft and supports a radial load of the drive shaft in a non-contact manner, by an electromagnetic force generated by the flow of a current within a predetermined current range through the drive support. A control section controls an operation of the load based on a magnetic flux margin degree expressed by the difference between a total magnetic flux amount generated at the drive support and a predetermined limit of the total magnetic flux amount for the drive support. The total magnetic flux amount includes driving magnetic flux and the supporting magnetic flux in a predetermined operation region of the load. The driving magnetic flux is generated at the drive support for rotating the drive shaft. The supporting magnetic flux is generated at the drive support for supporting a radial load of the drive shaft.

8 Claims, 12 Drawing Sheets

(51) Int. Cl.
    *F25B 1/053*     (2006.01)
    *F25B 49/02*     (2006.01)
    *H02K 7/00*     (2006.01)
    *H02K 7/14*     (2006.01)
    *H02K 9/10*     (2006.01)

(52) U.S. Cl.
    CPC ............... *H02K 7/003* (2013.01); *H02K 7/14* (2013.01); *H02K 9/10* (2013.01); *F25B 2400/07* (2013.01)

(58) Field of Classification Search
    CPC . H02K 7/003; H02K 9/10; H02K 7/09; F04D 27/02; H02P 27/04; H02P 25/024; H02P 1/00; H02P 1/04; H02P 1/24; H02P 1/26; H02P 1/46; H02P 3/00; H02P 7/00; H02P 6/00; H02P 21/00; H02P 23/00; H02P 27/00; H02P 27/06; H02P 25/00
    USPC ..... 62/619, 83, 176.3, 191, 215, 226, 228.1, 62/324.6, 401, 498, 508; 318/400.01, 318/700, 701, 721, 727, 799, 800, 801, 318/430, 432
    See application file for complete search history.

(56) References Cited

FOREIGN PATENT DOCUMENTS

JP      2014-126174 A     7/2014
JP      2017-61913 A     3/2017

* cited by examiner

FIG.4
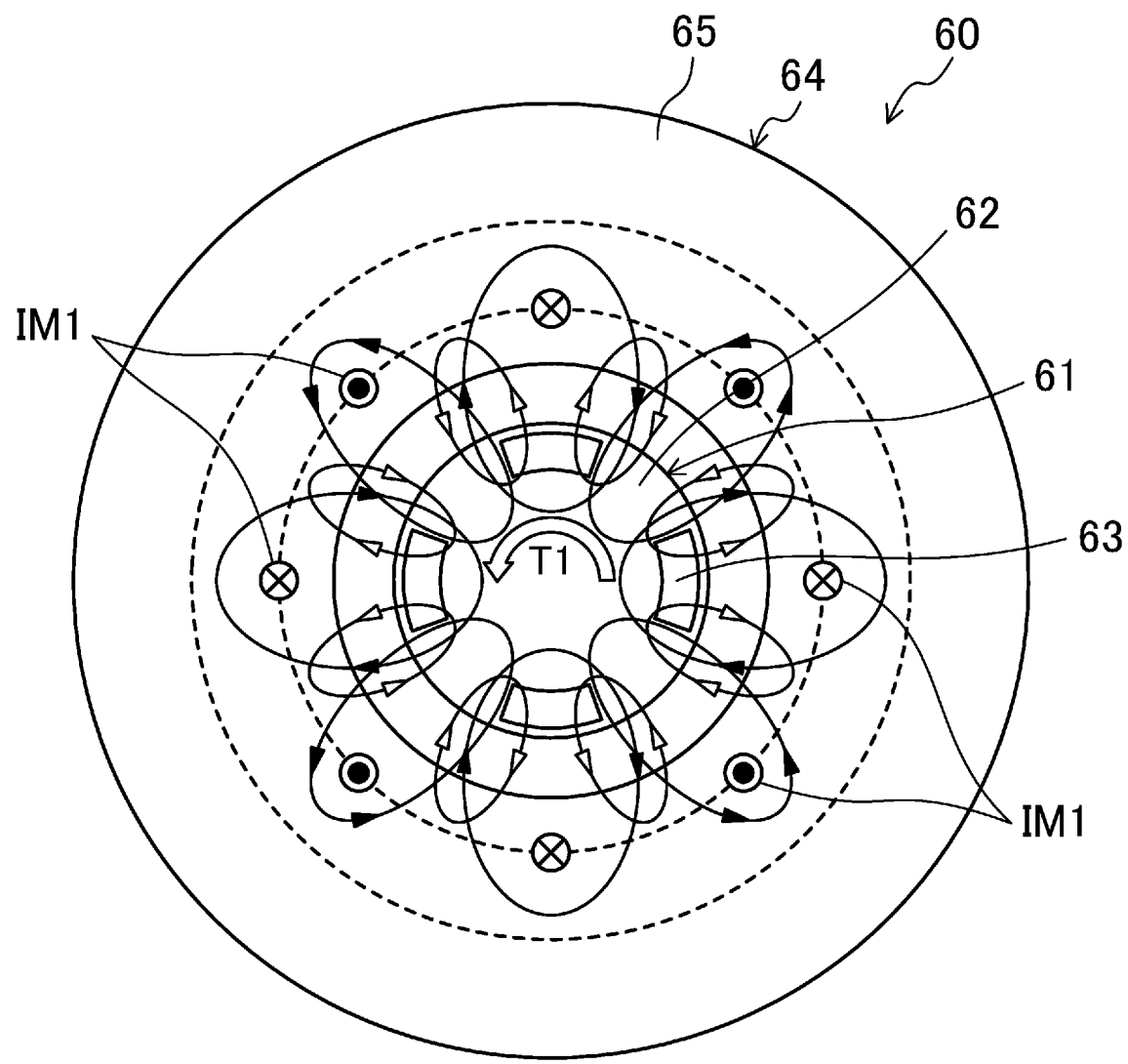
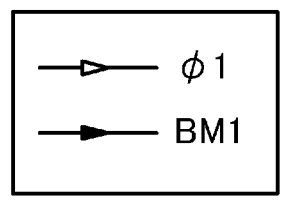

LOAD OPERATION CONTROL SYSTEM

TECHNICAL FIELD

The present invention relates to a system for controlling an operating condition of a load connected to a drive shaft, which is rotated and supported in a non-contact manner by a drive support.

BACKGROUND ART

There is a type of compressors that is called a turbo compressor. Turbo compressors are used in a variety of applications such as air conditioners.

As disclosed in Patent Document 1, turbo compressors have a problem called surging. Surging is a phenomenon in which, for example, when a load of a compressor in operation is suddenly changed from a high load to no load, the flow rate of the fluid (refrigerant) in the entire flow path including the compressor becomes unstable, and pipes or other elements which constitute the compressor and the flow path resonate, so that the pressure and the flow rate periodically fluctuate. Surging causes not only the instable operating state of the compressor, but also damage to the compressor.

CITATION LIST

Patent Documents

Patent Document 1: Japanese Unexamined Patent Publication No. 2013-127221

SUMMARY OF THE INVENTION

Technical Problem

Surging occurs when the operating state of the compressor enters the surging region. Thus, in the above-mentioned Patent Document 1, the operating state of the compressor is controlled so as not to enter the surging region by reducing a sudden decrease in the flow rate before and after the transition of the load state of the compressor.

That is, the compressor of Patent Document 1 is operated only in the steady state operation region. This configuration of the compressor of Patent Document 1 results in that the use of the compressor is limited and that the range of situations in which the compressor is operable is narrow.

The problem of limited use occurs not only in the compressors, but may also occur, for example, in a load such as pumps that may experience surging.

In view of the foregoing background, it is an object of the present invention to increase the width of operation of a load, such as a compressor, which may experience surging.

Solution to the Problem

A first aspect of the present disclosure is directed to a load operation control system including: a drive shaft (20) which rotates a load; a drive support (50) which rotates the drive shaft (20) and supports a radial load of the drive shaft (20) in a non-contact manner, by an electromagnetic force generated by flow of a current within a predetermined current range through the drive support (50); and a control section (91a) which controls an operating condition of the load based on a magnetic flux margin degree expressed by a difference between: a total magnetic flux amount including driving magnetic flux and supporting magnetic flux; and a predetermined limit of the total magnetic flux amount for the drive support (50), the driving magnetic flux being generated in the drive support (50) for rotating the drive shaft (20) and the supporting magnetic flux being generated at the drive support (50) for supporting the radial load of the drive shaft (20) in a predetermined operation region of the load.

In this aspect, it is possible to extend the operation region of the load as much as possible by changing the operating condition of the load in accordance with the magnetic flux margin degree of the drive support (50). Specifically, the radial load may increase if the operation region of the load is extended from a steady state operation region to a region where the rotating stall occurs. However, the control section (91a) changes the operating condition of the load in accordance with the magnetic flux margin degree of the drive support (50), which allows the extension of the operation region to the maximum controllable extent.

A second aspect of the present disclosure is an embodiment of the first aspect. In the second aspect, the drive support (50) has at least one bearingless motor (60, 70) having a set of a rotor (61, 71) and a stator (64, 74) to rotate the drive shaft (20) and supporting the radial load of the drive shaft (20) in a non-contact manner.

In the bearingless motor (60, 70), it is possible to change the ratio between the supporting magnetic flux and the driving magnetic flux in accordance, for example, with the operating state of the load and the magnetic flux margin degree. That is, the control (such as decreasing the driving magnetic flux and increasing the supporting magnetic flux, which are generated in the bearingless motor (60, 70)) can be performed, while ensuring a certain magnetic flux margin degree, so that the load can withstand the surging phenomenon in the case in which the operation region of the load is extended. The load is therefore operable in a wider variety of operating state without a problem.

A third aspect of the present disclosure is an embodiment of the second aspect. In the third aspect, the control section (91a) calculates, as the total magnetic flux amount, an amount of magnetic flux at a slot where a total value of the driving magnetic flux and the supporting magnetic flux is the largest among a plurality of slots formed in the stator (64, 74).

A fourth aspect of the present disclosure is an embodiment of the third aspect. In the fourth aspect, the control section (91a) calculates the total magnetic flux amount, using a sum of the driving magnetic flux, the supporting magnetic flux, and further magnetic flux of a permanent magnet (63, 73) included in the rotor (61, 71) as the total value.

It is therefore possible to obtain an accurate total magnetic flux amount generated in the bearingless motor (60, 70).

A fifth aspect of the present disclosure is an embodiment of any one of the first to fourth aspects. In the fifth aspect, the load is a turbo compressor (1) which compresses a refrigerant in a refrigerant circuit (110) configured to perform a refrigeration cycle, and the control section (91a) if the magnetic flux margin degree exceeds a predetermined value, adjusts at least one of a rotational speed of the turbo compressor (1) and a flow rate of the refrigerant such that a temperature of the refrigerant discharged from the turbo compressor (1) increases, and if the magnetic flux margin degree is below the predetermined value, adjusts at least one of the rotational speed of the turbo compressor (1) and the flow rate of the refrigerant such that the temperature of the refrigerant discharged from the turbo compressor (1) decreases.

If the magnetic flux margin degree exceeds the predetermined value, it is possible to determine that the drive support (50) has a margin in terms of magnetic flux. In this case, an increase in the temperature of the refrigerant discharged from the turbo compressor (1) allows an increase in the head (compression work) of the turbo compressor (1). That the turbo compressor (1) becomes operable in a region where the head is high means that the refrigerant circuit (110) is capable of performing the refrigeration cycle even in, for example, a high-temperature outdoor environment, which means that the operation region of the load is extended.

On the other hand, if the magnetic flux margin degree is below the predetermined value, it is possible to determine that the drive support (50) does not have a margin in terms of magnetic flux. In such a case, the temperature of the refrigerant discharged from the turbo compressor (1) is decreased, thereby decreasing the head (compression work) of the turbo compressor (1). It is therefore possible to avoid the occurrence of surging and rotating stall in the turbo compressor (1).

A sixth aspect of the present disclosure is an embodiment of the fifth aspect. In the sixth aspect, the load operation control system further includes an update section (91b) which updates the predetermined operation region, based on an operating state of the turbo compressor (1) at a time when the control section (91a) increases the temperature of the refrigerant discharged from the turbo compressor (1).

This configuration allows the next operation of the turbo compressor (1) to be performed with reference to the extended operation region.

A seventh aspect of the present disclosure is an embodiment of any one of the first to fourth aspects. In the seventh aspect, the load is a turbo compressor (1) which compresses a refrigerant in a refrigerant circuit (110) configured to perform a refrigeration cycle, and the control section (91a) if the magnetic flux margin degree exceeds a predetermined value, adjusts at least one of a rotational speed of the turbo compressor (1) and a flow rate of the refrigerant such that an output of an air conditioner (100) having the refrigerant circuit (110) decreases, and if the magnetic flux margin degree is below the predetermined value, adjusts at least one of the rotational speed of the turbo compressor (1) and the flow rate of the refrigerant such that the output of the air conditioner (100) increases.

The lower the output of the air conditioner (100) is, the more likely it is that the turbo compressor (1) enters the surging region. In contrast, the higher the output of the air conditioner (100) is, the less likely it is that the turbo compressor (1) enters the surging region.

If the magnetic flux margin degree exceeds the predetermined value and the drive support (50) has a margin in terms of magnetic flux, it is possible to use the margin of the magnetic flux to generate the supporting magnetic flux. Thus, the output of the air conditioner (100) is intentionally reduced to cause the operating state of the turbo compressor (1) to transition to the region where rotating stall and surging occur. This means that the operation region of the load is extended.

If the magnetic flux margin degree is below the predetermined value and the drive support (50) does not have a margin in terms of magnetic flux, it means that the drive support (50) does not have enough magnetic flux that can be used for the generation of the supporting magnetic flux. Thus, the output of the air conditioner (100) is increased to cause the turbo compressor (1) to operate in a region from which it is less likely that the turbo compressor (1) enters the region where rotating stall and surging occur. It is therefore possible to avoid the occurrence of surging and rotating stall in the turbo compressor (1).

An eighth aspect of the present disclosure is an embodiment of the seventh aspect. In the eighth aspect, the load operation control system further includes an update section (91b) which updates the predetermined operation region, based on an operating state of the turbo compressor (1) at a time when the control section (91a) decreases the output of the air conditioner (100).

This configuration allows the next operation of the turbo compressor (1) to be performed with reference to the extended operation region.

Advantages of the Invention

According to the aspects of the present disclosure, the operation region of a load is extended to a maximum operable extent, which allows the load driven by the drive support (50) to be operated in a wider variety of operating state.

BRIEF DESCRIPTION OF THE DRAWINGS

FIG. 4 is the transverse section of the first bearingless motor, showing magnetic flux of magnet and driving magnetic flux.

DESCRIPTION OF EMBODIMENTS

Embodiments of the present disclosure will now be described in detail with reference to the drawings. The embodiments below are merely exemplary ones in nature, and are not intended to limit the scope, applications, or use of the present invention.

<<First Embodiment>>

An example in which an air conditioner includes a compressor having a magnetic bearing device will be described below.

<General Configuration>

Figure 1:
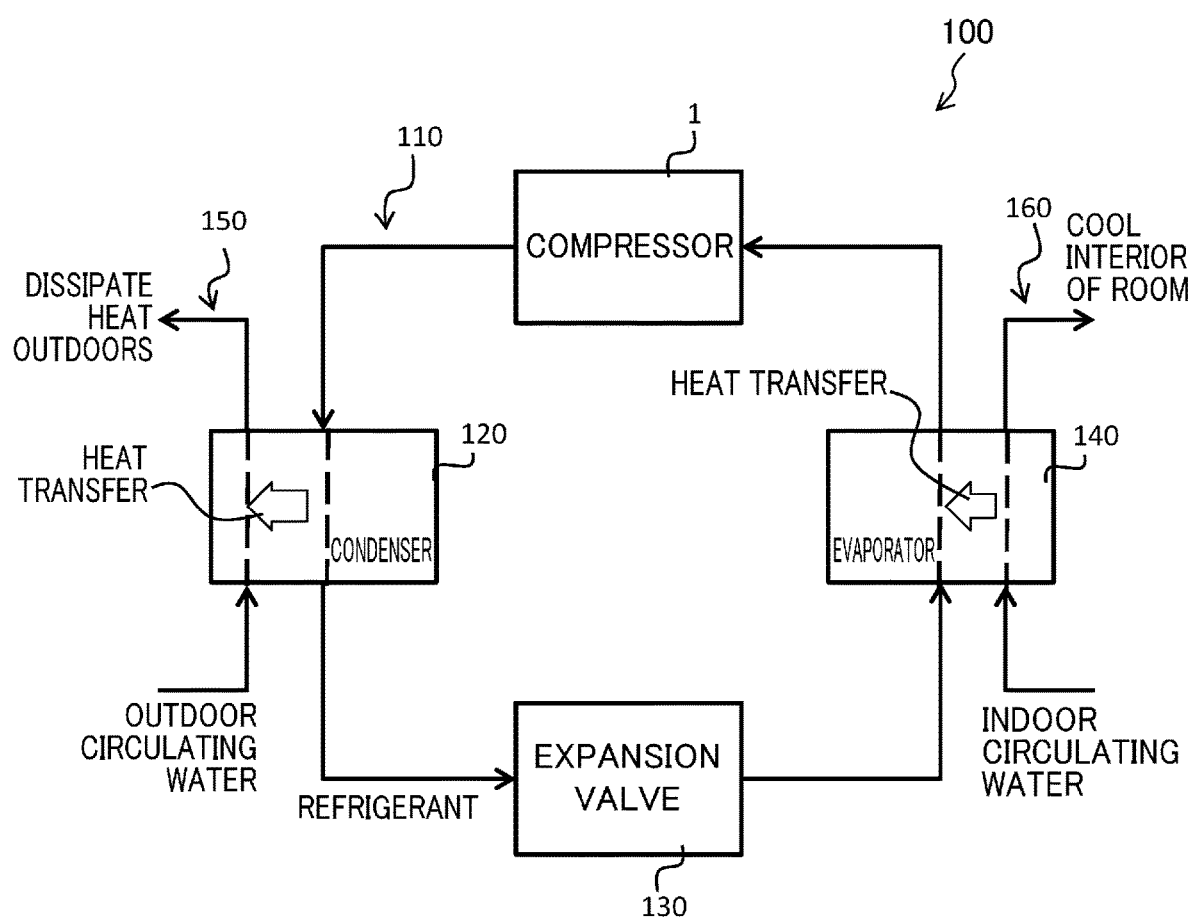
FIG. 1 is a piping system diagram of an air conditioner.

FIG. 1 is a piping system diagram of an air conditioner (100) according to a first embodiment of the present invention. As illustrated in FIG. 1, the air conditioner (100) is intended for air-conditioning the air in the room, and includes a refrigerant circuit (110) which is a closed circuit filled with refrigerant. The refrigerant circuit (110) includes a turbo compressor (1), a condenser (120), an expansion valve (130), and an evaporator (140) which are connected to one another via refrigerant pipes. The turbo compressor (1) according to the first embodiment is driven by bearingless motors (60, 70).

Although not shown, a sensor for detecting a refrigerant pressure and a sensor for detecting a refrigerant temperature are also provided in the refrigerant circuit (110).

An example will be described in the first embodiment, in which the condenser (120) and the evaporator (140) are used so that heat is exchanged between the refrigerant and an aqueous medium. That is, the air conditioner (100) according to the first embodiment is a so-called chiller unit which cools the interior of the room by means of the aqueous medium.

Specifically, not only the refrigerant circuit (110) but also an outdoor-side water circuit (150), in which the aqueous medium circulates, are connected to the condenser (120). In the condenser (120), the refrigerant dissipates heat to the aqueous medium (circulating water) in the outdoor-side water circuit (150) which has circulated from the outdoor side. The refrigerant is therefore cooled and condensed. The aqueous medium flowing out of the condenser (120) dissipates heat outdoors.

Not only the refrigerant circuit (110) but also an indoor-side water circuit (160), in which the aqueous medium circulates, are connected to the evaporator (140). In the evaporator (140), the refrigerant absorbs heat from the aqueous medium (circulating water) in the indoor-side water circuit (160) which has circulated from the indoor side. The refrigerant therefore evaporates. The aqueous medium flowing out of the evaporator (140) circulates through the indoor-side water circuit provided in the room, thereby cooling the interior of the room.

<Configuration of Turbo Compressor>

Figure 2:
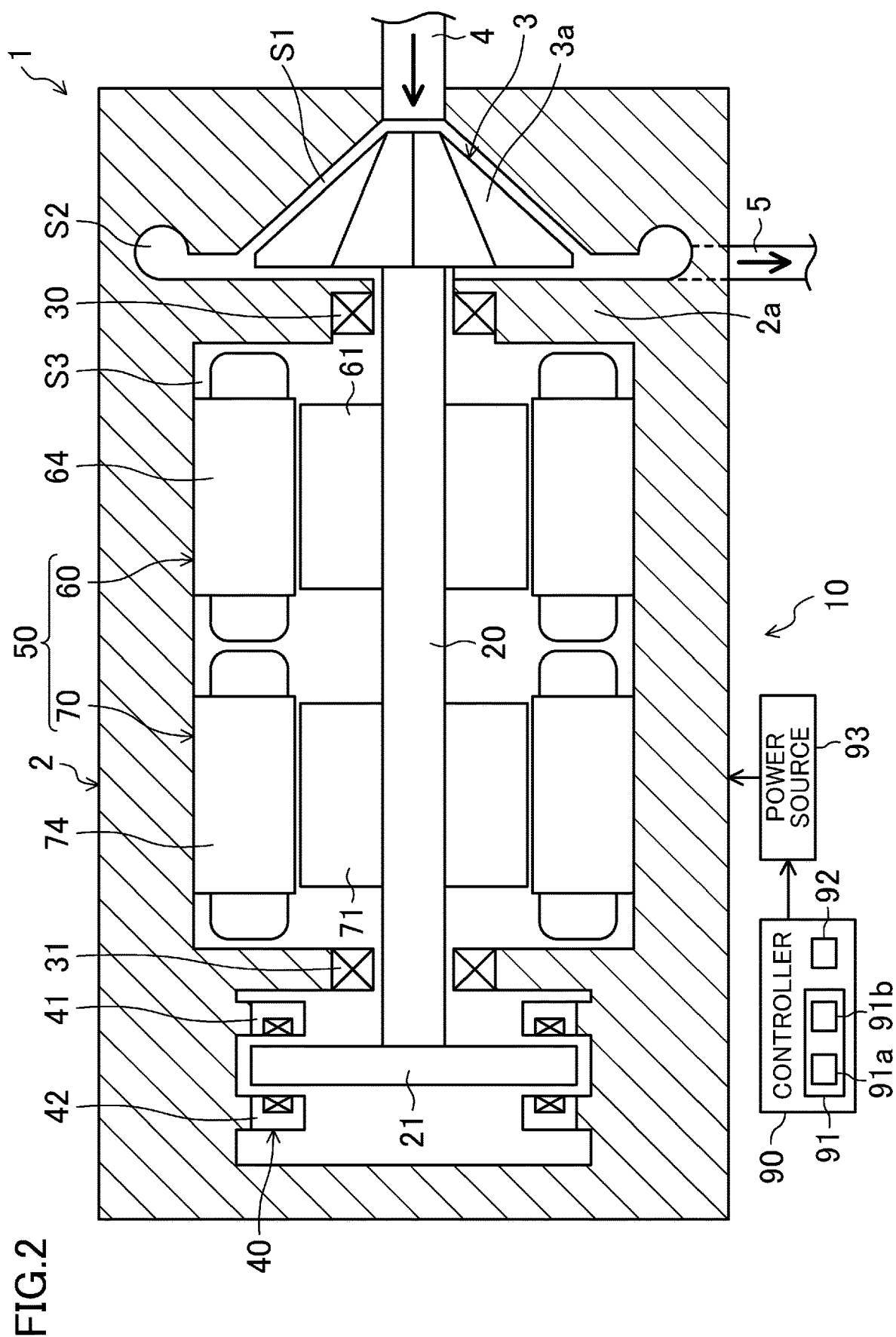
FIG. 2 is a diagram illustrating an example configuration of a compressor.

FIG. 2 is a diagram illustrating an example configuration of the turbo compressor (1) according to the first embodiment. As illustrated in FIG. 2, the turbo compressor (1) includes a casing (2), a compression mechanism (3), a drive shaft (20), touchdown bearings (30, 31), a thrust magnetic bearing (40), and a drive support (50).

Among these elements, the drive shaft (20), the touchdown bearings (30, 31), the thrust magnetic bearing (40), and the drive support (50) constitute a load operation control device (10), which corresponds to a load operation control system, together with a controller (90) and other elements which will be described later. The casing (2) and the compression mechanism (3) will be described first.

In the following description, the "axial direction" refers to a direction of the axis of rotation, which is the direction of the axis of the drive shaft (20). The "radial direction" refers to a direction perpendicular to the axial direction of the drive shaft (20). The "outer circumferential side" refers to a side farther from the axis of the drive shaft (20). The "inner circumferential side" refers to a side closer to the axis of the drive shaft (20).

—Casing—

The casing (2) is in a cylindrical shape with its both ends closed, and is arranged such that its axial direction extends horizontally. The space in the casing (2) is partitioned by a wall (2a). The space on the right of the wall (2a) constitutes an impeller chamber (S1) for accommodating an impeller (3a) of the compression mechanism (3). The space on the left of the wall (2a) constitutes an electric motor chamber (S3) for accommodating first and second bearingless motors (60, 70) included in the load operation control device (10). The drive shaft (20) extending in the axial direction of the casing (2) connects the impeller (3a) to the first and second bearingless motors (60, 70).

The drive shaft (20) is therefore capable of rotating the impeller (3a) of the turbo compressor (1).

—Compression Mechanism—

The compression mechanism (3) is configured to compress a fluid (a refrigerant in this example) and has the impeller (3a) as a major element. The impeller (3a) has a plurality of blades, and thus has substantially a conical outer shape. The impeller (3a) is accommodated in the impeller chamber (S1) while being connected and fixed to one end of the drive shaft (20). An intake pipe (4) and a discharge pipe (5) are connected to the impeller chamber (S1), and a compression space (S2) is formed in an outer circumferential portion of the impeller chamber (S1). The intake pipe (4) is intended to introduce the refrigerant from the outside into the impeller chamber (S1). The discharge pipe (5) is intended to return the high-pressure refrigerant compressed in the impeller chamber (S1) to the outside.

<Configuration of Load Operation Control Device>

The load operation control device (10) is intended to control the operation of the impeller (3a) of the above-described turbo compressor (1). As already mentioned, the load operation control device (10) includes, in addition to the drive shaft (20), the touchdown bearings (30, 31), the thrust magnetic bearing (40), the drive support (50) including the first bearingless motor (60) and the second bearingless motor (70), the controller (90), and a power source (93).

—Touchdown Bearing—

The touchdown bearings (30, 31) are provided at two positions so as to sandwich the two bearingless motors (60, 70) in the axial direction of the drive shaft (20). The touchdown bearing (30), which is one of the touchdown bearings, is provided in the vicinity of one end portion (a right end portion in FIG. 2) of the drive shaft (20). The other touchdown bearing (31) is provided in the vicinity of the other end portion of the drive shaft (20). The touchdown bearings (30, 31) are configured to support the drive shaft (20) when the first and second bearingless motors (60, 70) are not energized (i.e., when the drive shaft (20) is not floating).

—Thrust Magnetic Bearing—

As illustrated in FIG. 2, the thrust magnetic bearing (40) includes first and second electromagnets (41, 42) and is configured to support a disc-shaped portion (hereinafter referred to as a disk portion (21)) provided at the other end portion of the drive shaft (20) (i.e., the end portion opposite to the one end portion to which the impeller (3a) is fixed) in a non-contact manner by an electromagnetic force. The thrust magnetic bearing (40) can control the position of the supported portion (the disk portion (21)) of the drive shaft (20) in a direction in which the first and second electromagnets (41, 42) face each other (i.e., the axial direction, which is the lateral direction in FIG. 2) by controlling the electric current flowing through the first and second electromagnets (41, 42).

Although not shown in FIG. 2, a plurality of gap sensors are provided near the touchdown bearings (30, 31) and in the vicinity of the thrust magnetic bearing (40). Each gap sensor is constituted, for example, by an eddy current displacement sensor, and detects a gap between the disk portion (21) and the thrust magnetic bearing (40), and a gap between the stator (64, 74) and the rotor (61, 71) of each of the first and second bearingless motors (60, 70). The detection results of the gap sensors are input to the controller (90) and used for various controls.

—Drive Support—

The drive support (50) rotates the drive shaft (20) and supports the radial load of the drive shaft (20) in a non-contact manner, by the electromagnetic force generated by the flow of a current within a predetermined current range through the drive support (50). As already mentioned, the drive support (50) includes the first bearingless motor (60) and the second bearingless motor (70). The first bearingless motor (60) and the second bearingless motor (70) are arranged side by side along the axial direction of the drive shaft (20).

—First Bearingless Motor—

The first bearingless motor (60) is disposed in the electric motor chamber (S3) toward the impeller (3a). The first bearingless motor (60) has a set of a rotor (61) and a stator (64). The rotor (61) is fixed to the drive shaft (20), and the stator (64) is fixed to the inner circumferential wall of the casing (2).

Figure 3:
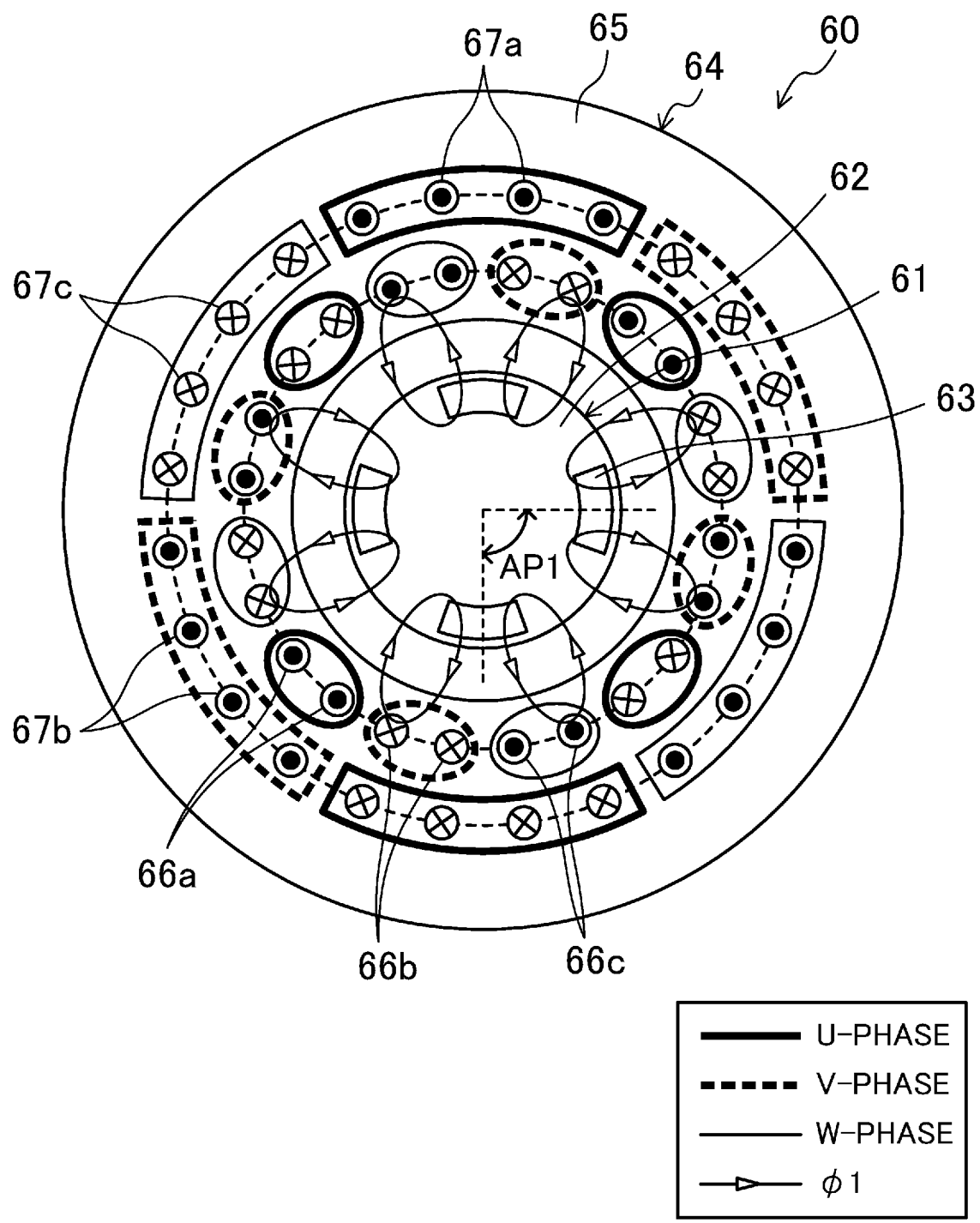
FIG. 3 is a diagram illustrating a transverse section of an example configuration of a first bearingless motor.

FIG. 3 is a diagram illustrating a transverse section of an example configuration of the first bearingless motor (60). As shown in FIG. 3, the first bearingless motor (60) is of a consequent-pole type. The stator (64) of the first bearingless motor (60) includes a back yoke (65), a plurality of toothed portions (not shown), driving coils (66a to 66c) and supporting coils (67a to 67c) which are wound around the toothed portions. The rotor (61) of the first bearingless motor (60) includes a core (62) and a plurality of (four in this example) permanent magnets (63) embedded in the core (62).

The stator (64) is made of a magnetic material (e.g., laminated steel sheets). The back yoke (65) of the stator (64) is in a cylindrical shape. The driving coils (66a to 66c) and the supporting coils (67a to 67c) are wound around each toothed portion in a distributed winding method. Thus, a plurality of slots (not shown) are formed in the stator (64). The driving coils (66a to 66c) and the supporting coils (67a to 67c) may be wound around each toothed portion in a concentrated winding method.

The driving coils (66a to 66c) are wound around the inner circumferential side of the toothed portions. The driving coils (66a to 66c) include a U-phase driving coil (66a) surrounded by a thick line in FIG. 3, a V-phase driving coil (66b) surrounded by a thick broken line, and a W-phase driving coil (66c) surrounded by a thin line.

The supporting coils (67a to 67c) are wound around the outer circumferential side of the toothed portions. The supporting coils (67a to 67c) include a U-phase supporting coil (67a) surrounded by a thick line in FIG. 3, a V-phase supporting coil (67b) surrounded by a thick broken line, and a W-phase supporting coil (67c) surrounded by a thin line.

The core (62) of the rotor (61) is in a cylindrical shape. The core (62) is provided with a shaft hole (not shown) for inserting the drive shaft (20) in a center portion of the core (62). The core (62) is made of a magnetic material (e.g., laminated steel sheets). Four permanent magnets (63) each having a shape along the outer circumferential surface of the core (62) are embedded in the vicinity of the outer circumferential surface of the core (62) at an angular pitch (AP1) of 90° in the circumferential direction of the rotor (61). The four permanent magnets (63) are identical in shape. The outer circumferential surface side of each permanent magnet (63) is an N pole, and the outer circumferential surface side of the core (62) between the permanent magnets (63) is a pseudo S pole. The outer circumferential surface side of each permanent magnet (63) may be an S pole.

FIG. 4 illustrates magnetic flux φ1 of magnet generated by each permanent magnet (63) and driving magnetic flux BM1 generated to rotate the impeller (3a) and the drive shaft (20) in the first bearingless motor (60). The first bearingless motor (60) is configured to generate a driving torque T1 in FIG. 4 (i.e., a torque for rotating the drive shaft (20) in the counterclockwise direction in FIG. 4) by the interaction between the magnetic flux φ1 of magnet and the driving magnetic flux BM1. In FIG. 4, a current IM1 equivalent to the current flowing through the driving coils (66a to 66c) is shown.

Figure 5:
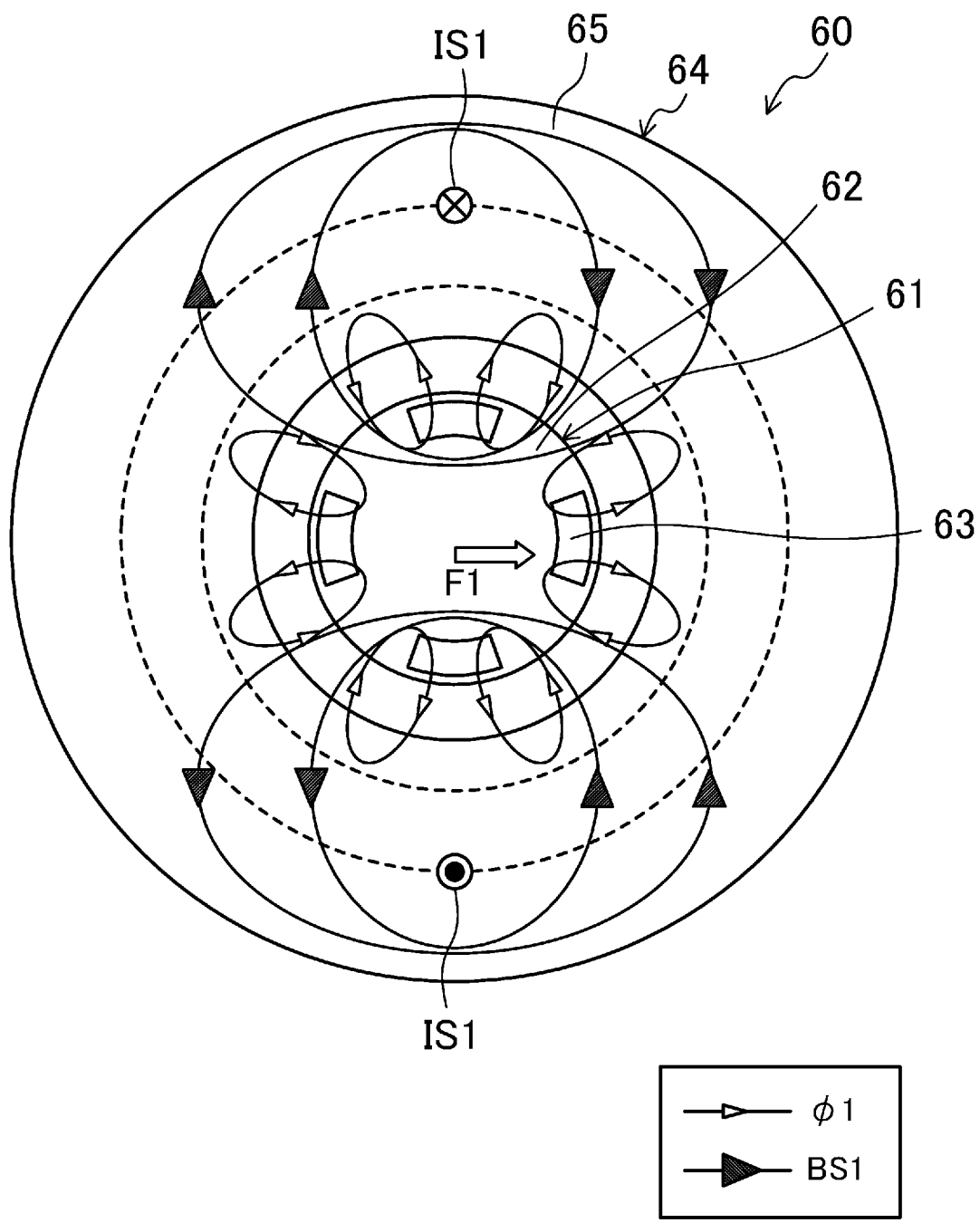
FIG. 5 is the transverse section of the first bearingless motor, showing the magnetic flux of the magnet and supporting magnetic flux.

FIG. 5 illustrates the magnetic flux φ1 of magnet generated by each permanent magnet (63) and supporting magnetic flux BS1 generated to support the radial load of the drive shaft (20) in a non-contact manner in the first bearingless motor (60). The first bearingless motor (60) is configured to generate a supporting force F1 in FIG. 5 (i.e., a force pushing the drive shaft (20) rightward in FIG. 5) by the interaction between the magnetic flux φ1 of magnet and the supporting magnetic flux BS1. In FIG. 5, a current IS1 equivalent to the current flowing through the supporting coils (67a to 67c) is shown.

As can be seen from FIG. 5, the magnetic path of the supporting magnetic flux BS1 passes through the back yoke (65) and toothed portions of the stator (64), the air gap, and the core (62) of the rotor (61). The magnetic resistance of each of the back yoke (65), the toothed portions, and the core (62) is smaller than the magnetic resistance of the permanent magnet (63). Thus, the first bearingless motor (60) has a lower magnetic resistance of the magnetic path for generating a magnetic force for supporting the radial load of the drive shaft (20), than the second bearingless motor (70) provided with permanent magnets (73) around substantially the entire outer circumferential surface of the rotor (71) as will be described later (that is, the second bearingless motor (70) including a permanent magnet (73) in the magnetic path for generating a magnetic force for supporting the radial load of the drive shaft (20)). This configuration allows the first bearingless motor (60) to generate a greater supporting force for supporting the radial load of the drive shaft (20), compared to the second bearingless motor (70).

Figure 6:
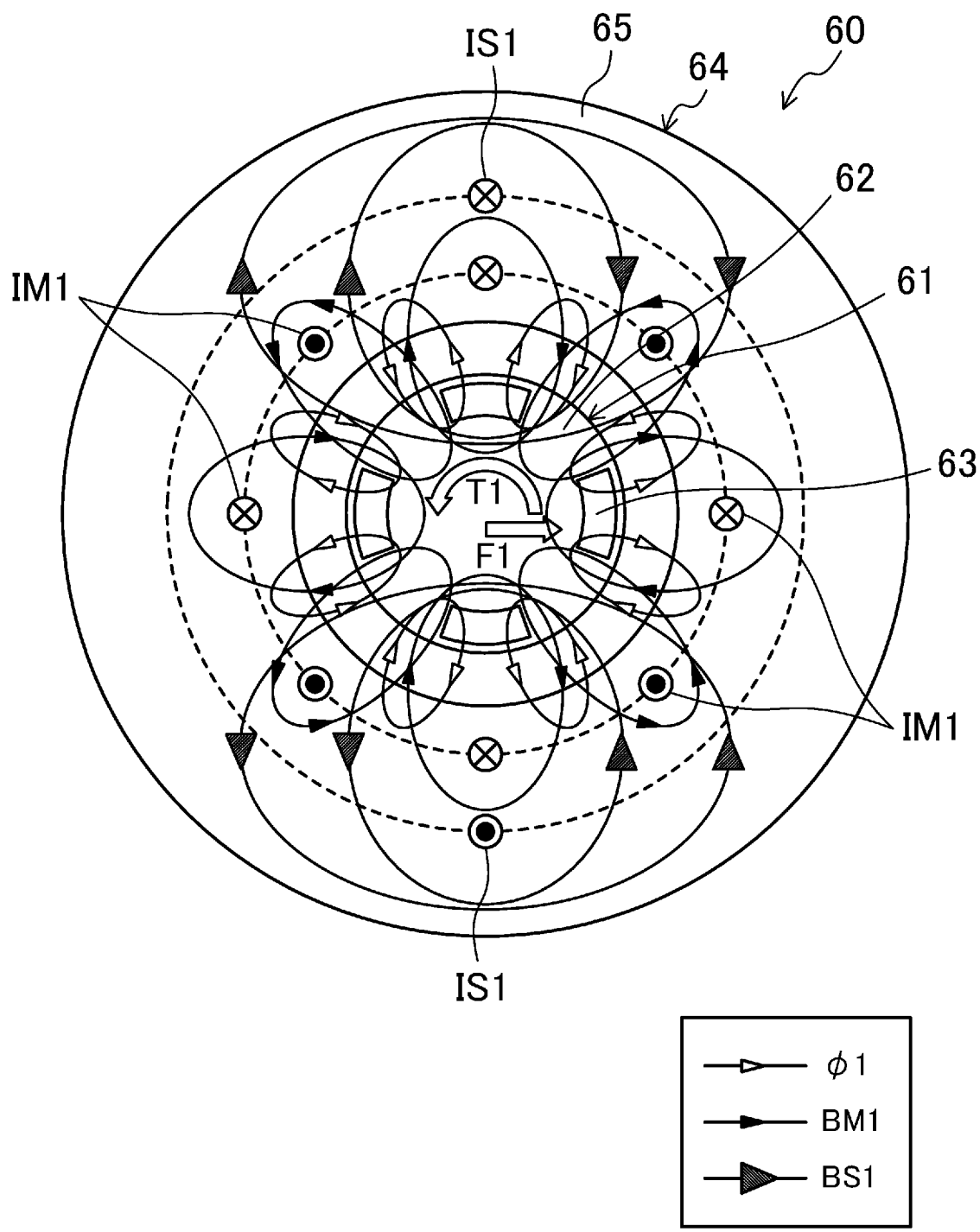
FIG. 6 is the transverse section of the first bearingless motor, showing the magnetic flux of magnet, the driving magnetic flux, and the supporting magnetic flux.

FIG. 6 illustrates the magnetic flux φ1 of magnet generated by each permanent magnet (63), driving magnetic flux BM1 generated to rotate the impeller (3a) and the drive shaft (20), and supporting magnetic flux BS1 generated to support the radial load of the drive shaft (20) in a non-contact manner in the first bearingless motor (60). The first bearingless motor (60) is configured to simultaneously generate a driving torque T1 and a supporting force F1 in FIG. 6 by the interaction between the magnetic flux φ1 of magnet, the driving magnetic flux BM1, and the supporting magnetic flux BS1. In FIG. 6, a current IM1 and a current IS1 which are equivalent to the current flowing through the driving coils (66a to 66c) and the supporting coils (67a to 67c), respectively, are shown.

—Second Bearingless Motor—

Figure 7:
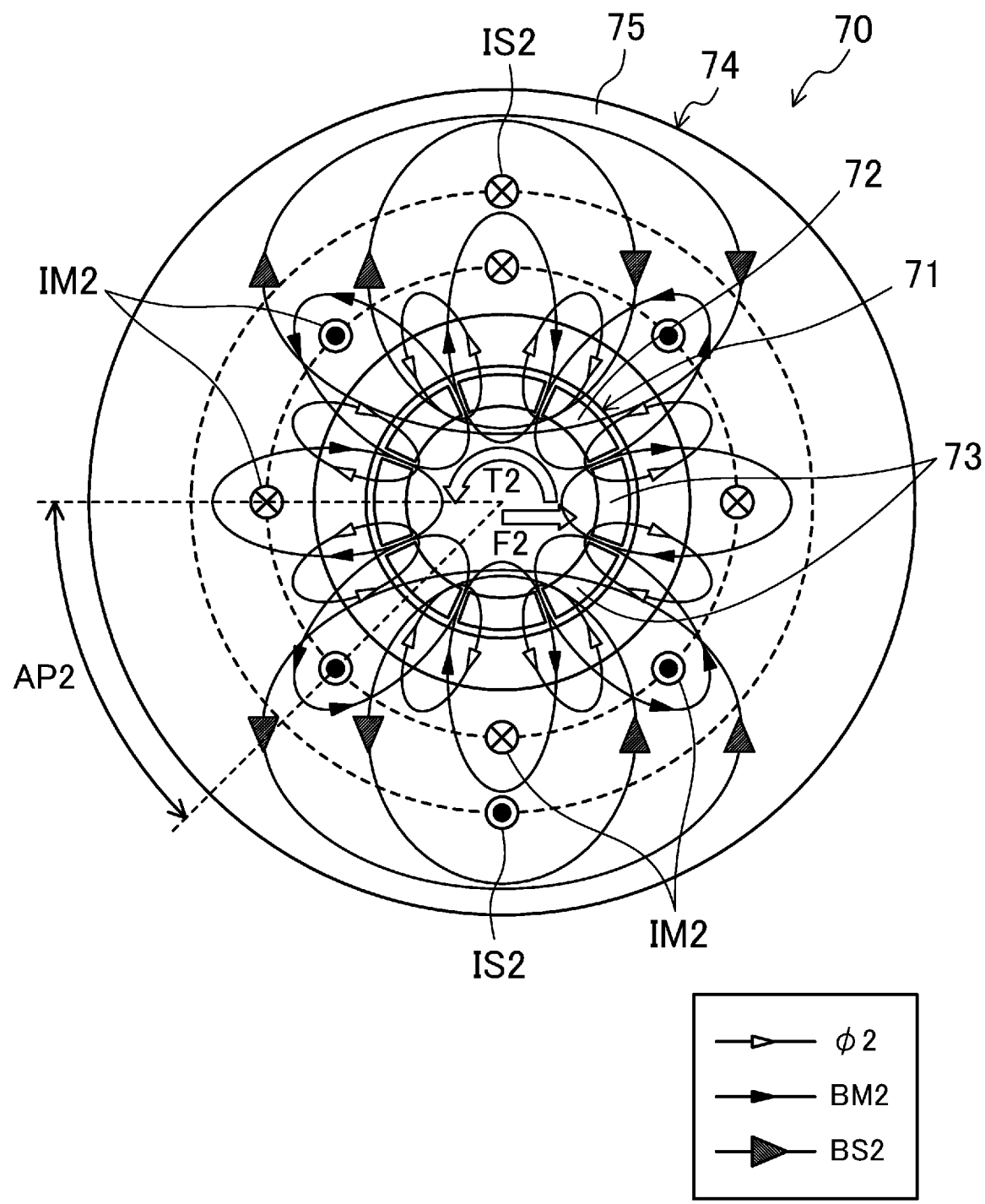
FIG. 7 is a transverse section of a second bearingless motor, showing magnetic flux of magnet, driving magnetic flux, and supporting magnetic flux.

The second bearingless motor (70) is disposed in the electric motor chamber (S3) farther from the impeller (3a) as illustrated in FIG. 2. The second bearingless motor (70) has a set of a rotor (71) and a stator (74) as illustrated in FIG. 7. The rotor (71) is fixed to the drive shaft (20), and the stator (74) is fixed to the casing (2).

Although not shown because the configuration is similar to that shown in FIG. 3, the stator (74) of the second bearingless motor (70) includes a plurality of toothed portions around which driving coils and supporting coils are wound to form a plurality of slots.

FIG. 7 is a diagram illustrating a transverse section of an example configuration of the second bearingless motor (70). As shown in FIG. 7, the second bearingless motor (70) is of an embedded magnet type which exhibits substantially the same behavior as a surface magnet type bearingless motor. The configuration of the stator (74) of the second bearingless motor (70) is the same as the configuration of the stator (64) of the first bearingless motor (60). The rotor (71) of the second bearingless motor (70) includes a core (72) and a plurality of (eight in this example) permanent magnets (73) embedded in the core (72).

The core (72) of the rotor (71) is in a cylindrical shape. The core (72) is provided with a shaft hole (not shown) for inserting the drive shaft (20) in a center portion of the core (72). The core (72) is made of a magnetic material (e.g., laminated steel sheets). Eight permanent magnets (73) each having a shape along the outer circumferential surface of the core (72) are embedded in the vicinity of the outer circumferential surface of the core (72) at an angular pitch (AP2) of 45° in the circumferential direction of the rotor (71) (that is, at half an angular pitch (AP1) of 90° in the case of the first bearingless motor (60)). The eight permanent magnets (73) are identical in shape, and identical in shape with the four permanent magnets (63) of the first bearingless motor (60) as well. The outer circumferential surface side of the permanent magnets (73) exhibits N poles and S poles that appear alternately in the circumferential direction of the rotor (71).

FIG. 7 illustrates magnetic flux φ2 of magnet generated by each permanent magnet (73), driving magnetic flux BM2 generated to rotate the impeller (3a) and the drive shaft (20), and supporting magnetic flux BS2 generated to support the radial load of the drive shaft (20) in a non-contact manner in the second bearingless motor (70). The second bearingless motor (70) is configured to simultaneously generate a driving torque T2 (i.e., a torque for rotating the drive shaft (20) in the counterclockwise direction in FIG. 7) and a supporting force F2 (i.e., a force pushing the drive shaft (20) rightward in FIG. 7), which are shown in FIG. 7, by the interaction between the magnetic flux φ2 of magnet, the driving magnetic flux BM2, and the supporting magnetic flux BS2.

As can be seen from FIG. 7, the magnetic path of the supporting magnetic flux BS2 passes through the back yoke (75) and toothed portions of the stator (74), the air gap, and the permanent magnets (73) and core (72) of the rotor (71).

The number of permanent magnets (73) in the second bearingless motor (70) is larger than the number of permanent magnets (63) in the first bearingless motor (60). Thus, the second bearingless motor (70) exhibits a higher density of magnetic flux generated by the permanent magnets (73), as compared to the first bearingless motor (60) (see FIG. 4). This configuration allows the second bearingless motor (70) to generate a greater driving torque T2 for rotating the impeller (3a) and the drive shaft (20), compared to the first bearingless motor (60).

—Controller—

The controller (90) is comprised of a microcomputer (91) and a memory (92) storing software or the like for operating the microcomputer (91). The controller (90) generates and outputs a voltage command value (a thrust voltage command value) for controlling a voltage to be supplied to the thrust magnetic bearing (40), and a voltage command value (a motor voltage command value) for controlling a voltage to be supplied to the first and second bearingless motors (60, 70) so that the drive shaft (20) is positioned at a desired position.

The voltage command values are generated using, for example, a detection value of a gap sensor (not shown) capable of detecting a gap between the disk portion (21) and the thrust magnetic bearing (40), a detection value of a gap sensor (not shown) capable of detecting a gap between the stator (64, 74) and the rotor (61, 71) in the first and second bearingless motors (60, 70), and information on target rotational speeds of the impeller (3a) and the drive shaft (20).

In particular, the microcomputer (91) of the controller (90) according to the first embodiment functions as an operation control section (91a) (which corresponds to the control section). The operation control section (91a) calculates a degree of margin of the total magnetic flux of the first and second bearingless motors (60, 70) (hereinafter referred to as a magnetic flux margin degree), and controls the operating condition of the turbo compressor (1) (specifically, the impeller (3a) of the compression mechanism (3)) which is a load of the first and second bearingless motors (60, 70), based on the calculated magnetic flux margin degree. This operation control may be referred to as extension control for the operation region of the turbo compressor (1), and will be described in detail later.

The microcomputer (91) of the controller (90) according to the first embodiment also functions as an update section (91b). The memory (92) stores a predetermined operation region (which will be described later) comprised of a plurality of regions. The update section (91b) overwrites the memory (92) when the predetermined operation region is updated.

—Power Source—

The power source (93) supplies voltages to the thrust magnetic bearing (40) and the first and second bearingless motors (60, 70) based on the thrust voltage command value and the motor voltage command value from the controller (90), respectively. For example, the power source (93) may be configured as a pulse width modulation (PWM) amplifier.

<Operation Region of Turbo Compressor>

Figure 8:
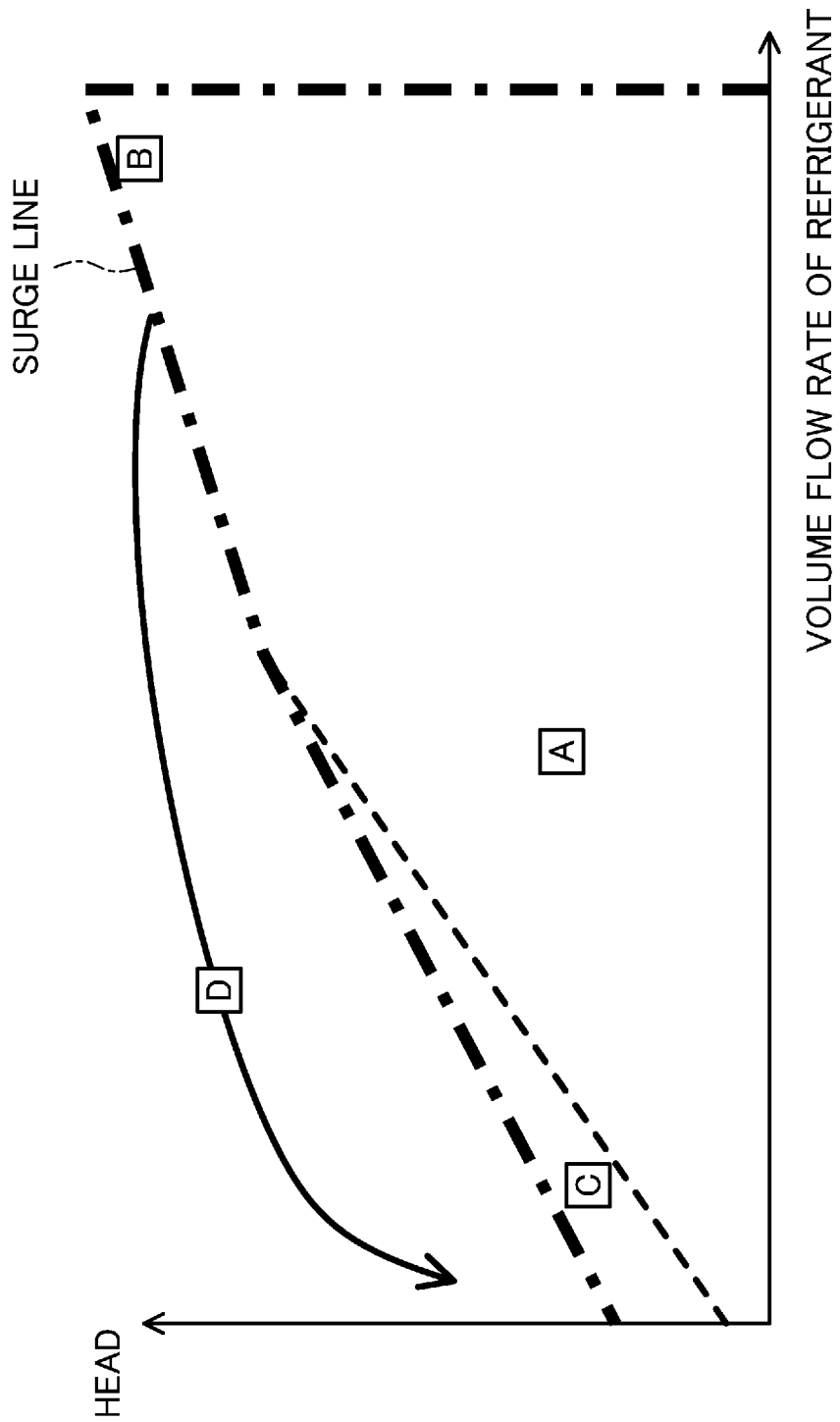
FIG. 8 is a graph for explaining an operation region of a turbo compressor.

An operation region of the turbo compressor (1) will be described with reference to FIG. 8. In FIG. 8, the horizontal axis represents a volume flow rate of the refrigerant, and the vertical axis represents the head. The turbo compressor (1) can be operated in a predetermined operation region by the flow of a current in a predetermined current range through the drive support (50) (i.e., the first and second bearingless motors (60, 70) in the first embodiment) by the power source (93).

The predetermined operation region mainly includes a steady state operation region (A), a high-load torque region (B), and a turbulence region (C) which are inside a surge line indicated by a heavy dot-dash line in FIG. 8, and a surging region (D) outside the surge line.

The steady state operation region (A) is indicated by the reference numeral A in FIG. 8, in which region the load torque of the impeller (3a) and the drive shaft (20) (i.e., the driving torque T1 and T2 for driving the impeller (3a) and the drive shaft (20)) is relatively low, and the radial load of the drive shaft (20) is relatively low as well.

The high-load torque region (B) is indicated by the reference numeral B in FIG. 8, in which region the load torque of the impeller (3a) and the drive shaft (20) is relatively high, and the radial load of the drive shaft (20) is relatively high as well.

The turbulence region (C) is indicated by the reference numeral C in FIG. 8, in which region the load torque of the impeller (3a) and the drive shaft (20) is relatively low, and the radial load of the drive shaft (20) is relatively high.

The surging region (D) is indicated by the reference numeral D in FIG. 8, in which region the load torque of the impeller (3a) and the drive shaft (20) is relatively low, and the radial load of the drive shaft (20) is relatively high. The radial load of the drive shaft (20) in the turbo compressor (1) is maximized at a predetermined point in the surging region (D). When the turbo compressor (1) is operated at this predetermined point, a value of the supporting magnetic flux BS is maximized, and a maximum supporting force current flows to the supporting coils (67a to 67c) of each bearingless motor (60, 70).

In the following description, a case in which the turbo compressor (1) is operated in the steady state operation region (A) and the high-load torque region (B) is referred to as a "normal operation," and the steady state operation region (A) and the high-load torque region (B) are collectively referred to as a "first operable region." In the present embodiment, the "first operable region" is a default region that is set in advance. The turbulence region (C) is also referred to as a "region where rotating stall occurs."

<Calculation of Margin Degree of Total Magnetic Flux>

How the operation control section (91a) calculates the magnetic flux margin degree will be described in detail.

The operation control section (91a) obtains a total amount of the magnetic flux generated in each of the bearingless motors (60, 70). The operation control section (91a) subtracts the obtained total amount of the magnetic flux from a predetermined limit of the total magnetic flux of each bearingless motor (60, 70), and thereby obtains the magnetic flux margin degree represented by the thus obtained difference (the result of the subtraction).

As already mentioned, the magnetic flux generated in the respective first and second bearingless motors (60, 70) includes, for example: the driving magnetic flux BM1 and BM2 generated in the first and second bearingless motors (60, 70), respectively, for rotating the impeller (3a) and the drive shaft (20); the supporting magnetic flux BS1 and BS2 generated in the first and second bearingless motors (60, 70), respectively, for supporting the radial load of the drive shaft (20) in a non-contact manner; and the magnetic flux φ1 and φ2 generated by the permanent magnets (63, 73), in the predetermined operation region of the turbo compressor (1) shown in FIG. 8. First, the operation control section (91a) calculates, for each of the bearingless motors (60, 70), the amount of magnetic flux at a slot (not shown) where the total value of the driving magnetic flux BM1 and BM2, the supporting magnetic flux BS1 and BS2, and the magnetic flux φ1 and φ2 of magnet is the largest among all of the slots (not shown) formed in the stators (64, 74).

Specifically, assuming that the amount of the driving magnetic flux BM1 and BM2 is "ΦM," that the amount of the supporting magnetic flux BS1 and BS2 is "ΦS," and that the amount of the magnetic flux φ1 and φ2 of magnet is "ΦP," the magnetic flux amount Φn of the $n^{th}$ slot at a certain moment can be expressed as follows.

[Equation 1]

$$\Phi_n = \Phi_{Mn} + \Phi_{Sn} + \Phi_{Pn} = \Phi_{Mn}(i_M, \theta_M, \theta_R) + \Phi_{Sn}(i_S, \theta_S, \theta_R) + \Phi_{Pn}(\theta_R) \quad (1)$$

In the above equation, each argument is an instantaneous value. In the above equation, the "iM" represents a driving equivalent current (a current equivalent to the current flowing through the driving coils), and is a parameter which contributes to the strength of the entire driving magnetic flux BM1 and BM2. The "iS" represents a supporting equivalent current (a current equivalent to the current flowing through the supporting coils), and is a parameter which contributes to the strength of the entire supporting magnetic flux BS1 and BS2. The "θM" represents an electrical angle of the driving magnetic flux BM1 and BM2, and is a parameter which contributes to the magnetic resistance at each slot for the driving magnetic flux BM1 and BM2 with respect to each slot. The "θS" represents an electrical angle of the supporting magnetic flux BS1 and BS2, and is a parameter which contributes to the magnetic resistance at each slot for the supporting magnetic flux BS1 and BS2 with respect to each slot. The "θR" represents an electrical angle of the rotor, and is a parameter which contributes to the magnetic resistance.

The magnetic flux amount Φn of the $n^{th}$ slot at a certain instant is obtained by the expansion of the above equation (1) as shown below.

[Equation 2]

$$\Phi_n = \frac{N_M i_M}{R_{Mn}(\theta_M, \theta_R)} + \frac{N_S i_S}{R_{Sn}(\theta_S, \theta_R)} + \frac{F_p}{R_{P_n}(\theta_R)} \quad (2)$$

In the above equation, the "NM" represents the number of windings of the driving coils (66a to 66c) in each bearingless motor (60, 70). The "NS" represents the number of windings of the supporting coils (67a to 67c) in each bearingless motor (60, 70). The "RMn" represents the magnetic resistance at each slot for the driving magnetic flux BM1 and BM2 at the $n^{th}$ slot in each bearingless motor (60, 70). The "RSn" represents the magnetic resistance at each slot for the supporting magnetic flux BS1 and BS2 at the $n^{th}$ slot in each bearingless motor (60, 70). The "RPn" represents the magnetic resistance of the permanent magnets (63, 73) at the $n^{th}$ slot in each bearingless motor (60, 70). The "FP" represents a magnetomotive force of the permanent magnets (63, 73) in each bearingless motor (60, 70).

Thus, the maximum total magnetic flux amount ΦMax (which corresponds to a total magnetic flux amount of the magnetic flux generated at the drive support (50)) at the slots of each bearingless motor (60, 70) can be expressed as follows.

[Equation 3]

$$\Phi_{Max} = \max_n \{\Phi_n\} = \max_n \left\{ \frac{N_M i_M}{R_{Mn}(\theta_M, \theta_R)} + \frac{N_S i_S}{R_{Sn}(\theta_S, \theta_R)} + \frac{F_p}{R_{P_n}(\theta_R)} \right\} \quad (3)$$

Assuming that a predetermined limit of the total magnetic flux amount of each bearingless motor (60, 70) is "ΦULim," the magnetic flux margin degree MΦ in each bearingless motor (60, 70) can be expressed as follows.

[Equation 4]

$$M_\Phi = \Phi_{ULim} - \Phi_{Max} \quad (4)$$

Thus, the magnetic flux margin degree MΦ can be expressed as follows from the equations (3) and (4).

[Equation 5]

$$M_\Phi = \Phi_{ULim} - \max_n \left\{ \frac{N_M i_M}{R_{Mn}(\theta_M, \theta_R)} + \frac{N_S i_S}{R_{Sn}(\theta_S, \theta_R)} + \frac{F_P}{R_{Pn}(\theta_R)} \right\} \quad (5)$$

The limit ΦULim of the total magnetic flux amount is, for example, a value determined by, and unique to, the material characteristics of the bearingless motors (60, 70).

In the following description, the sum of the magnetic flux margin degrees MΦ of the bearingless motors (60, 70) obtained by the above equation (5) is used to control operation of the compression mechanism (3), as an example.

<Control Operation of Bearingless Motor Based on Magnetic Flux Margin Degree>

—Extension Control for Operation Region—

Figure 9:
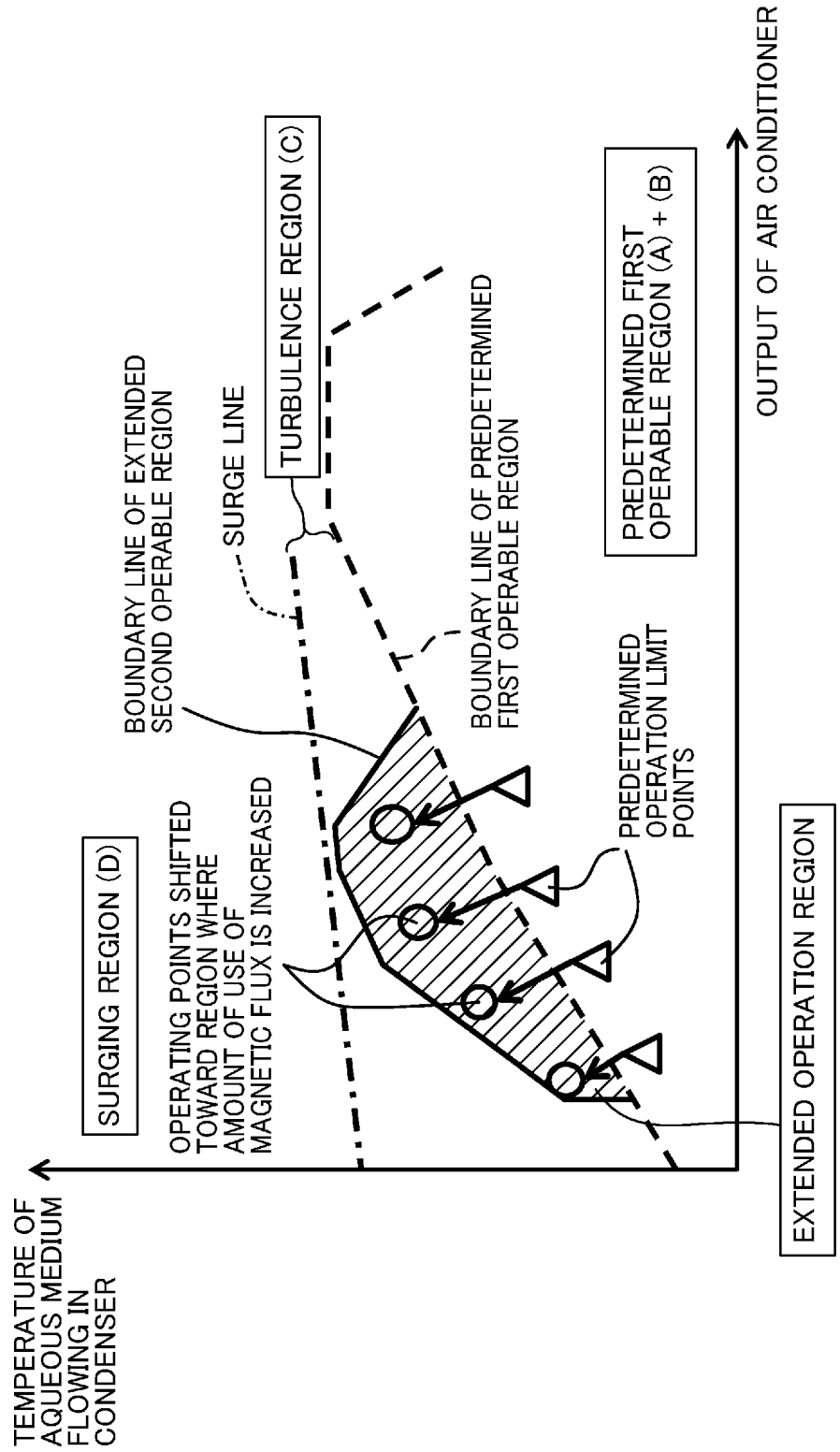
FIG. 9 is a graph for explaining extension control for the operation region.

FIG. 9 is a graph for explaining extension control for the operation region. In FIG. 9, the horizontal axis represents an output of the air conditioner (100), and the vertical axis represents a temperature of the aqueous medium flowing into the condenser (120) in the outdoor-side water circuit (150). The "OUTPUT OF AIR CONDITIONER" on the horizontal axis in FIG. 9 is a parameter correlating with the "VOLUME FLOW RATE OF REFRIGERANT" on the horizontal axis in FIG. 8. The output of the air conditioner (100) represents the amount of heat per unit time which is taken away from the aqueous medium by the evaporator (140) of the air conditioner (100) shown in FIG. 1 (i.e., temperature condition of the aqueous medium). The "TEMPERATURE OF AQUEOUS MEDIUM FLOWING IN CONDENSER" on the vertical axis in FIG. 9 is a parameter correlating with the "HEAD" on the vertical axis in FIG. 8.

In FIG. 9, the area enclosed by the broken line, the vertical axis, and the horizontal axis corresponds to the predetermined "first operable region" including the normal operation region (A) and the high-load torque region (B) in FIG. 8. In FIG. 9, the area sandwiched between the surge line indicated by the dot-dash line and the boundary line of the first operable region indicated by the broken line corresponds to the "region where rotating stall occurs," which is the turbulence region (C) in FIG. 8. In FIG. 9, the region above the surge line indicated by the dot-dash line corresponds to the surging region (D) in FIG. 8.

Figure 10:
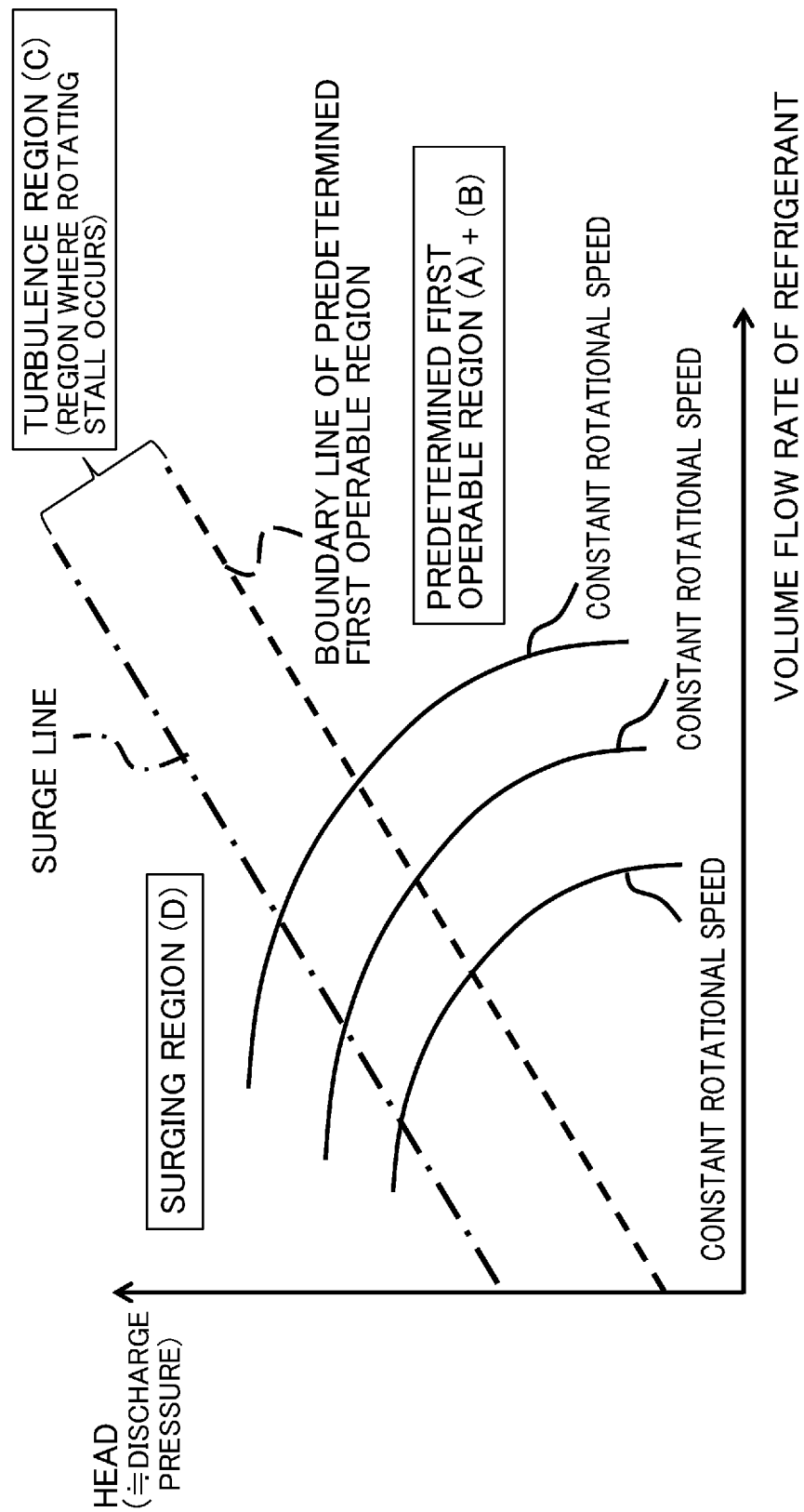
FIG. 10 is a graph for explaining a mechanism of surging.

The surging will be described below. FIG. 10 is a graph for explaining a mechanism of surging. The turbo compressor (1) (specifically, the impeller (3a)) is designed such that the smaller the volume flow rate of the refrigerant flowing into the turbo compressor (1) is, the higher the head becomes, in a state in which the rotational speed is constant. In the predetermined first operable region of FIG. 10, the head decreases when the volume flow rate of the refrigerant increases due to a disturbance. The reduction in head means a reduction in discharge pressure. In contrast, the head increases (i.e., the discharge pressure increases) when the volume flow rate of the refrigerant is reduced due to a disturbance, which allows the volume flow rate of the refrigerant to be relatively stable.

However, if the volume flow rate of the refrigerant is further reduced while the rotational speed of the turbo compressor (1) (specifically, the impeller (3a)) is constant, the angle of blades of the impeller (3a) with respect to the refrigerant flow (i.e., the angle of attack) is too large, so that the stall phenomenon occurs in some of the blades. This phenomenon occurs in a rotating manner so as to propagate among the blades of the impeller (3a), and is thus called "rotating stall" (the turbulence region (C) in FIG. 10).

During the rotating stall, the pressure distribution near the impeller (3a) is non-uniform, and a pulsating exciting force is applied to the impeller (3a).

Further, if the volume flow rate of the refrigerant is reduced to an extremely small value while the rotational speed is constant, the volume flow rate of the refrigerant described above becomes unstable because the head converges to substantially a constant value, that is, the gradient of the head to the volume flow rate of the refrigerant approaches zero (0) (the surging region (D) in FIG. 10). The volume flow rate of the refrigerant in the entire flow path from the evaporator (140) to the condenser (120) in the refrigerant circuit (110) therefore becomes very unstable, which results in transmitting a larger pulsating exciting force to the impeller (3a). This phenomenon is called "surging." The exciting force causes the turbo compressor (1) to vibrate, making the operation of the turbo compressor (1) unstable. The exciting force is a cause of an excessive load applied to mechanical components constituting the turbo compressor (1), and may damage the mechanical components in the worst case.

To avoid such surging, in general, the predetermined first operable region is set to be a region inside the surge line except the turbulence region (C) (specifically, the steady state operation region (A) and the high-load torque region (B)) as already described with reference to FIG. 9.

The surging may occur when, for example, the power supply to the air conditioner (100) from a commercial power source (not shown) is suddenly interrupted by a power failure while the turbo compressor (1) is operated near the boundary line of the predetermined first operable region. When the supply power to the air conditioner (100) is cut off, the operation of the turbo compressor (1) is also stopped. If this happens, the volume flow rate of the refrigerant suddenly decreases without a significant change in the head of the turbo compressor (1), and the head of the turbo compressor (1) also decreases thereafter. This is because the operating state of the turbo compressor (1) may transition, even temporarily, from the predetermined first operable region to the surging region (D) beyond the surge line, in a period from the sudden decrease in the volume flow rate of the refrigerant to the decrease in the head of the turbo compressor (1).

To address this phenomenon, when the operation control section (91a) according to the first embodiment determines that the total magnetic flux amount of the first and second bearingless motors (60, 70) still has a margin with respect to the limit of the total magnetic flux amount, based on the magnitude of the magnetic flux margin degrees of the first and second bearingless motors (60, 70), the operation control section (91a) controls the operating condition of the turbo compressor (1), which is a load, such that the turbo compressor (1) is operated in the turbulence region (C). That is, the operation control section (91a) extends the region where the operation of the turbo compressor (1) is permitted, from the predetermined first operable region (the region below the broken line in FIG. 9) to a "second operable region" which is a region having the first operable region plus an "extended operation region" that is hatched in FIG. 9.

The extension of the operation region means that the turbo compressor (1) is operated at a point closer to the surge line than a point in the predetermined first operable region. This configuration may increase the possibility that the operating state of the turbo compressor (1) temporarily transitions to the surging region (D) beyond the surge line. However, the operation control section (91a) according to the first embodiment performs a control on the turbo compressor (1) so that the turbo compressor (1) can well withstand the rotating stall and the surging, in addition to the extension of the operation region.

Specifically, the operation control section (91*a*) performs a control so that the margin of the total magnetic flux amount of the first and second bearingless motors (60, 70) is used to generate a supporting force for supporting the drive shaft (20), based on the magnetic flux margin degree of the first and second bearingless motors (60, 70). As already mentioned, each bearingless motor (60, 70) is capable of generating the driving magnetic flux BM1, BM2 and the supporting magnetic flux BS1, BS2. The operation control section (91*a*) generates and outputs the voltage command value (i.e., the motor voltage command value) so that the margin of the total magnetic flux amount of the first and second bearingless motors (60, 70) is used not to generate the driving magnetic flux BM1, BM2, but to generate the supporting magnetic flux BS1, BS2.

Specifically, in operating the turbo compressor (1) in the turbulence region (C), the operation control section (91*a*) transmits the motor voltage command value to the power source (93) so that the ratio of the current IS for generating the supporting magnetic flux BS to the current IM (i.e., the sum of the current flowing through the supporting coils (67*a* to 67*c*) of the first and second bearingless motors (60, 70)) for generating the driving magnetic flux BM (i.e., the sum (BM1+BM2) of the driving magnetic fluxes generated at the first and second bearingless motors (60, 70)) is increased more than in the normal operation, when compared at the same rotational speed. During this operation, the power source (93) supplies a voltage to the first and second bearingless motors (60, 70), based on the motor voltage command value transmitted from the operation control section (91*a*), so that the ratio of the current IS flowing to the supporting coils (67*a* to 67*c*) to the current IM flowing to the driving coils (66*a* to 66*c*) in the first and second bearingless motors (60, 70) is increased.

As a result, in the turbulence region (C) (i.e., a rotating stall region), a supporting force for supporting the drive shaft (20), which supporting force is capable of withstanding the exciting force caused by the rotating stall (and surging), is generated at the first and second bearingless motors (60, 70). Damage of the mechanical components constituting the turbo compressor (1) caused by the rotating stall and the surging can thus be reduced. Such extension control for the operation region allows using the turbo compressor (1) in the operation region (the extended operation region in FIG. 9) which has been intentionally refrained from use to avoid the occurrence of the rotating stall or surging. The range of situations in which the turbo compressor (1) is used is thus widened.

—Flow of Extension Control for Operation Region—

Flow of extension control for operation region will be described below with reference to FIG. 11.

First, the operation control section (91*a*) determines whether the extension control for the operation region is permitted or not (step St11). Whether the extension control for the operation region is permitted or not can be appropriately determined by an installer who installs the air conditioner (100) or a user, for example.

If the expansion control for the operation region is not permitted (No in step St11), the operation control section (91*a*) sets the output of the air conditioner (100) and the temperature of the aqueous medium flowing into the condenser (120) to values for operation of the turbo compressor (1) in the first operable region (step St12). In other words, in this case, the operation region is not extended, and the turbo compressor (1) is operated within the predetermined first operable region shown in FIG. 9 and FIG. 10.

If the extension control for the operation range is permitted (Yes in step St11), the operation control section (91*a*) estimates the total magnetic flux amount in the first and second bearingless motors (60, 70) in the current state by calculation based on the above equation (3) (step St13). The operation control section (91*a*) then calculates the margin degree of total magnetic flux of the first and second bearingless motors (60, 70) based on the above equation (5) (step St14). The operation control section (91*a*) compares the obtained margin degree of total magnetic flux with a predetermined value (step St15).

If the obtained margin degree of total magnetic flux is greater than or equal to the predetermined value (Yes in step St15), the operation control section (91*a*) performs a control on at least one of the components of the turbo compressor (1) and the refrigerant circuit (110) so as to increase the temperature (discharge temperature) of the refrigerant discharged from the turbo compressor (1) so that the temperature of the aqueous medium flowing into the condenser (120) is raised from the current water temperature, while keeping the output of the air conditioner (100) constant (St16). The state in which the obtained margin degree of total magnetic flux is greater than or equal to the predetermined value means that the first and second bearingless motors (60, 70) have a margin for the magnetic flux to be generated therein. In a situation of cooling the interior of a room, the temperature of water flowing into the condenser (120) rises as the outdoor temperature rises, which increases the refrigerant temperature in the condenser (120) and the refrigerant pressure accordingly. In this situation as well, the operation control section (91*a*) controls the turbo compressor (1) to adjust at least one of the rotational speed of the turbo compressor (1) and the flow rate of the refrigerant in the refrigerant circuit (110) so as to increase the discharge pressure of the turbo compressor (1) and raise the discharge temperature of the refrigerant, in a case in which the aqueous medium on the indoor side is constantly cooled to a certain temperature, regardless of the outdoor temperature (i.e., in a case in which the output of the air conditioner (100) is constant). For example, the operation control section (91*a*) controls the turbo compressor (1) to increase the rotational speed of the turbo compressor (1) and/or reduce the flow rate of the refrigerant so as to increase the discharge pressure of the turbo compressor (1) and raise the discharge temperature of the refrigerant.

The increase in the discharge pressure of the turbo compressor (1) is equivalent to the rise of the head of the turbo compressor (1). That is, step St16 in FIG. 11 means that the operation region of the turbo compressor (1) is extended from the predetermined first operable region shown in FIG. 9 to the second operable region including the first operable region plus the extended operation region. Step St16 in FIG. 11 further means that the operation limit point of the turbo compressor (1) has transitioned from a point (triangular mark in FIG. 9) near the boundary line of the predetermined first operable region to an operating point (round mark in FIG. 9) as a result of a change toward the region where the amount of use of the magnetic flux is increased. In step St16, the margin of the magnetic flux associated with the extension of the operation region is used to generate the supporting magnetic flux BS1 and BS2 of the first and second bearingless motors (60, 70), thereby increasing the drive supporting force of the drive shaft (20) and the impeller (3*a*) included in the compression mechanism (3).

After step St16, the update section (91b) resets the predetermined operation region currently stored in the memory (92) to the predetermined extended operation region which has been extended in step St16 (step St17). That is, the predetermined operation region including the second operable region, which is a region after extension, is used as a default value in the next extension control for the operation region.

If the obtained margin degree of total magnetic flux is below the predetermined value (No in step St15), the operation control section (91a) performs a control on at least one of the components of the turbo compressor (1) and the refrigerant circuit (110) so as to reduce the temperature (discharge temperature) of the refrigerant discharged from the turbo compressor (1) so that the temperature of the aqueous medium flowing into the condenser (120) drops from the current water temperature, while keeping the output of the air conditioner (100) constant (St18). The state in which the obtained margin degree of total magnetic flux is below the predetermined value means that the first and second bearingless motors (60, 70) do not have a margin for the magnetic flux to be generated therein. Thus, the operation control section (91a) controls the turbo compressor (1) to adjust at least one of the rotational speed of the turbo compressor (1) and the flow rate of the refrigerant in the refrigerant circuit (110) so as to reduce the discharge pressure of the turbo compressor (1) and drop the discharge temperature of the refrigerant. For example, the operation control section (91a) controls the turbo compressor (1) to reduce the rotational speed of the turbo compressor (1) and/or increase the flow rate of the refrigerant so as to reduce the temperature of the refrigerant discharged from the turbo compressor (1). In this case, the operation region of the turbo compressor (1) is not extended because the head is reduced.

<Advantages>

In the first embodiment, it is possible to extend the operation region of the turbo compressor (1) to the maximum controllable extent, by changing the operating condition of the turbo compressor (1) in accordance with the magnetic flux margin degree of the drive support (50). Specifically, the operation control section (91a) performs a control or the like in which the margin of the magnetic flux is used to generate the supporting magnetic flux in accordance with the magnetic flux margin degree of the drive support (50) in the region where the rotating stall occurs. The turbo compressor (1) is therefore operable, without any problem, not only in the first operable region shown in FIG. 9, but also in the region where the rotating stall occurs (the turbulence region (C), that is, the extended operation region), for example. The turbo compressor (1) is therefore operable in a wider variety of operating state.

In particular, the drive support (50) has the first bearingless motor (60) and the second bearingless motor (70). These bearingless motors (60, 70) are capable of changing the ratio between the supporting magnetic flux and the driving magnetic flux in accordance with the operating state of the load and the magnetic flux margin degree. That is, the control (such as decreasing the driving magnetic flux and increasing the supporting magnetic flux, which are generated at the bearingless motors (60, 70)) can be performed, while ensuring a certain magnetic flux margin degree, so that the turbo compressor (1) can withstand the surging phenomenon in the case in which the operation region of the turbo compressor (1) is extended. The turbo compressor (1) is therefore operable in a wider variety of operating state without a problem.

Further, the operation control section (91a) calculates, as a total magnetic flux amount, the amount of magnetic flux at a slot where the total value of the driving magnetic flux BM1 and BM2, the supporting magnetic flux BS1 and BS2, and the magnetic flux φ1 and φ2 of the permanent magnets (63, 73) included in the rotors (61, 71) is the largest among the plurality of slots formed in the stators (64, 74). It is therefore possible to obtain the accurate total magnetic flux amount generated in the bearingless motors (60, 70). As a result, magnetic saturation is avoided, which makes it possible to extend the operation region as much as possible while maintaining the accuracy in control of the drive support (50).

Figure 11:
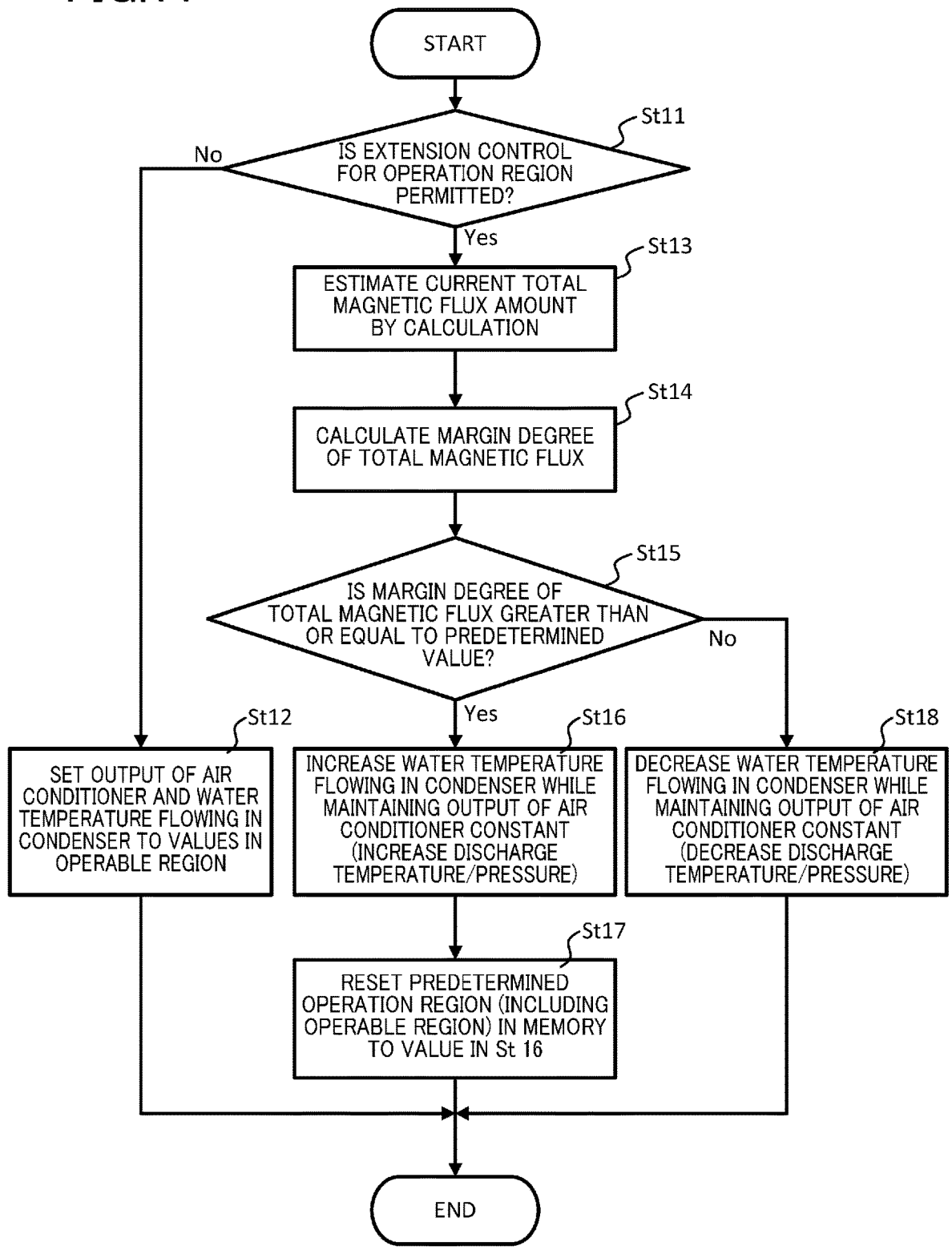
FIG. 11 is a flowchart indicating the flow of extension control for the operation region according to a first embodiment.

If the magnetic flux margin degree exceeds the predetermined value as in step St16 in FIG. 11, it is possible to determine that the drive support (50) has a margin in terms of magnetic flux. The operation control section (91a) therefore increases the head (compression work) of the turbo compressor (1) (i.e., increases the temperature of the refrigerant discharged from the turbo compressor (1)), thereby raising the temperature of the aqueous medium flowing into the condenser (120). The increase in the temperature of the aqueous medium flowing into the condenser (120) means that the refrigerant circuit (110) is capable of performing the refrigeration cycle even in, for example, a high-temperature outdoor environment, which means that the operation region of the load is extended.

On the other hand, if the magnetic flux margin degree is below the predetermined value as in step St18 in FIG. 11, it is possible to determine that the drive support (50) does not have a margin in terms of magnetic flux. The operation control section (91a) therefore decreases the temperature of the refrigerant discharged from the turbo compressor (1) thereby decreasing the head (compression work) of the turbo compressor (1). It is therefore possible to avoid the occurrence of surging and rotating stall in the turbo compressor (1).

As shown in step St17 in FIG. 11, the update section (91b) updates the predetermined operation region, based on the operating state of the turbo compressor (1) at the time when the control section (91a) raises the temperature of the refrigerant discharged from the turbo compressor (1). This configuration allows the next operation of the turbo compressor (1) to be performed with reference to the extended operation region.

<<Second Embodiment>>

In the first embodiment, as shown in steps St16 and St18 in FIG. 11, the output of the air conditioner (100) is maintained at a constant value in the control for dropping the temperature (discharge temperature) of the refrigerant based on the magnetic flux margin degree. In the second embodiment, unlike the first embodiment, the output of the air conditioner (100) is changed in the control for dropping the temperature (discharge temperature) of the refrigerant based on the magnetic flux margin degree.

Figure 12:
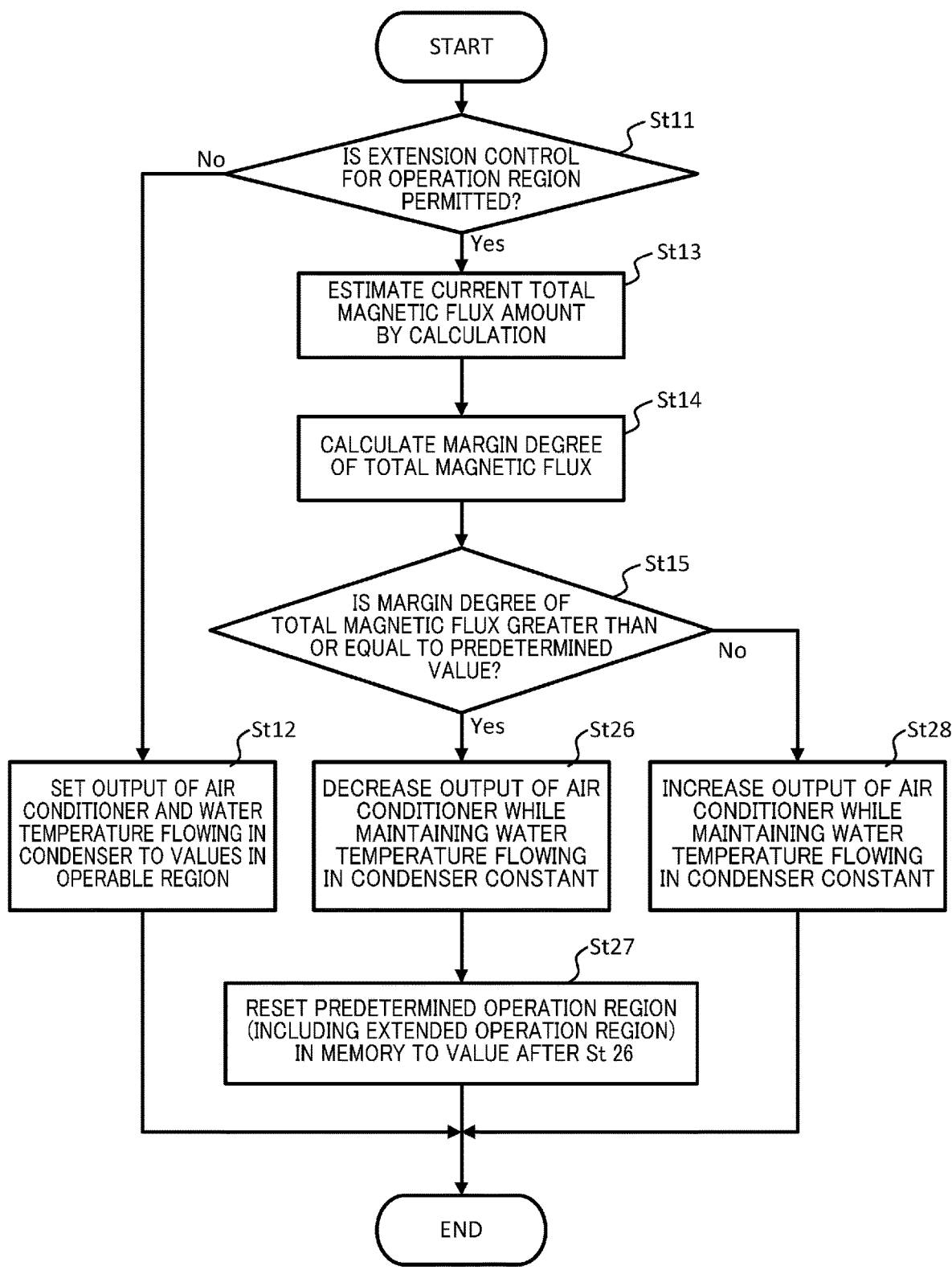
FIG. 12 is a flowchart indicating the flow of extension control for the operation region according to a second embodiment.

The second embodiment is different from the first embodiment only in that part of the flow of the extension control for the operation region shown in FIG. 12 is different from that in FIG. 11 according to the first embodiment. The configurations of the turbo compressor (1), the air conditioner (100), and the load operation control device (10) are the same as those of the first embodiment. Only the portions in FIG. 12 which are different from FIG. 11 will be described in the following description.

—Flow of Extension Control for Operation Region—

Steps St11 to St15 in FIG. 12 are the same as those in FIG. 11.

In step St15 in FIG. 12, if the obtained margin degree of total magnetic flux is greater than or equal to the predetermined value (Yes in step St15), the operation control section (91a) adjusts at least one of the rotational speed of the turbo compressor (1) and the flow rate of the refrigerant flowing through the refrigerant circuit (110) so as to decrease the output of the air conditioner (100), while keeping the temperature of the aqueous medium flowing in the condenser (120) constant (St26).

After step St26, the update section (91b) resets the predetermined operation region currently stored in the memory (92) to the predetermined extended operation region which has been extended in step St26 (step St27). That is, the predetermined operation region including the second operable region, which is a region after extension, is used as a default value in the next extension control for the operation region.

If the margin degree of total magnetic flux is below the predetermined value (No in step St15), the operation control section (91a) adjusts at least one of the rotational speed of the turbo compressor (1) and the flow rate of the refrigerant flowing through the refrigerant circuit (110) so as to increase the output of the air conditioner (100), while keeping the temperature of the aqueous medium flowing in the condenser (120) constant (St28).

<Advantages>

With reference to FIG. 9, the lower the output of the air conditioner (100) is, the more likely it is that the turbo compressor (1) enters the turbulence region (C). In contrast, the higher the output of the air conditioner (100) is, the less likely it is that the turbo compressor (1) enters the turbulence area (C).

If the magnetic flux margin degree exceeds the predetermined value and the drive support (50) has a margin in terms of magnetic flux as in step St26, it is possible to use the margin for the magnetic flux for generation of the supporting magnetic flux BS1 and BS2. Thus, in the second embodiment, the output of the air conditioner (100) is intentionally reduced to cause the operating state of the turbo compressor (1) to transition to the turbulence region (C). This means that the operation region of the load is extended.

On the other hand, if the magnetic flux margin degree is below the predetermined value and the drive support (50) does not have a margin in terms of magnetic flux, it means that the drive support (50) does not have enough magnetic flux that can be used for the generation of the supporting magnetic flux BS1 and BS2. Thus, in the second embodiment, the output of the air conditioner (100) is increased so that the operating state of the turbo compressor (1) is less likely to transition to the turbulence region (C). It is therefore possible to avoid the occurrence of surging and rotating stall in the turbo compressor (1).

<<Other Embodiments>>

The load operation control device (10) is also applicable to a drive support (50) which includes, in place of the two bearingless motors (60, 70), a radial magnetic bearing which generates a drive supporting force for supporting the drive shaft, and a dynamo-electric machine which is other than the bearingless motor and generates a rotational driving force for rotating the drive shaft.

Further, the load operation control device (10) is also applicable to a drive support (50) which includes one radial magnetic bearing and one bearingless motor.

In a case of the drive support (50) comprised of a plurality of bearingless motors, the number of the bearingless motors is not limited to two, and may be one or three or more.

The type of the bearingless motors (60, 70) is not limited to the consequent-pole type or the like.

The bearingless motors (60, 70) may be configured to have a coil having both driving and supporting functions, instead of separate coils independently having driving and supporting functions.

The rotor (61, 71) and the stator (64, 74) may be made of a material other than laminated steel sheets.

The number of impeller (3a) of the turbo compressor (1) is not limited to one, but may be two or more. For example, one impeller may be attached to each end of the drive shaft (20).

The load of the load operation control device (10) may be anything that may experience surging. The load is not limited to the turbo compressor (1), and may be a pump or the like.

In the case where the bearingless motor does not have a permanent magnet, the total magnetic flux amount generated in the bearingless motors (60, 70) is determined by the total value of the driving magnetic flux φM and the supporting magnetic flux φS without adding the magnetic flux φP of magnet.

The method for calculating the magnetic flux margin degree using the equations (1) to (5) is an example. The magnetic flux margin degree may be calculated by a method different from the method using the equations (1) to (5). For example, a peak value of the magnetic flux margin degree MΦ per predetermined time and/or a lowpass filtered value of the magnetic flux margin degree MΦ may be used as the magnetic flux margin degree MΦ.

The first and second embodiments illustrate the air conditioner (100) as a chiller unit, but the air conditioner (100) is not limited to a chiller unit.

The predetermined operation region is updated in step St17 in FIG. 11 and step St27 in FIG. 12, but these steps St17 and St27 are not essential.

Steps St16 and St18 in FIG. 11 illustrate a case in which the temperature of the aqueous medium flowing into the condenser (120) is changed from the current water temperature, while keeping the output of the air conditioner (100) constant. However, the temperature of the aqueous medium flowing into the evaporator (140), instead of the condenser (120), may be changed from the current water temperature. Specifically, in step St16, the operation control section (91a) may decrease the temperature of the aqueous medium flowing into the evaporator (140) from the current water temperature, while keeping the output of the air conditioner (100) constant. In step St18, the operation control section (91a) may increase the temperature of the aqueous medium flowing into the evaporator (140) from the current water temperature, while keeping the output of the air conditioner (100) constant.

INDUSTRIAL APPLICABILITY

As can be seen from the foregoing description, the present invention is useful as a system for controlling operation of a load that may experience surging in a configuration of a device having a drive shaft which drives the load and is rotated and supported in a non-contact manner by a drive support.

DESCRIPTION OF REFERENCE CHARACTERS

1 Turbo Compressor
10 Load Operation Control Device (Load Operation Control System)
20 Drive Shaft
50 Drive Support
60 First Bearingless Motor
61 Rotor
64 Stator
70 Second Bearingless Motor
71 Rotor
74 Stator
91a Operation Control Section (Control Section)
91b Update Section

The invention claimed is:

1. A load operation control system, comprising:
a drive shaft which rotates a load;
a drive support which rotates the drive shaft and supports a radial load of the drive shaft in a non-contact manner, by an electromagnetic force generated by flow of a current within a predetermined current range through the drive support; and
a control section which controls an operating condition of the load based on a magnetic flux margin degree expressed by a difference between: a total magnetic flux amount including driving magnetic flux and supporting magnetic flux; and a predetermined limit of the total magnetic flux amount for the drive support, the driving magnetic flux being generated at the drive support for rotating the drive shaft and the supporting magnetic flux being generated at the drive support for supporting the radial load of the drive shaft in a predetermined operation region of the load.

2. The system of claim 1, wherein
the drive support has at least one bearingless motor having a set of a rotor and a stator to rotate the drive shaft and supporting the radial load of the drive shaft in a non-contact manner.

3. The system of claim 2, wherein
the control section calculates, as the total magnetic flux amount, an amount of magnetic flux at a slot where a total value of the driving magnetic flux and the supporting magnetic flux is the largest among a plurality of slots formed in the stator.

4. The system of claim 3, wherein
the control section calculates the total magnetic flux amount, using a sum of the driving magnetic flux, the supporting magnetic flux, and further magnetic flux of a permanent magnet included in the rotor as the total value.

5. The system of claim 1, wherein
the load is a turbo compressor which compresses a refrigerant in a refrigerant circuit configured to perform a refrigeration cycle, and
the control section
if the magnetic flux margin degree exceeds a predetermined value, adjusts at least one of a rotational speed of the turbo compressor and a flow rate of the refrigerant such that a temperature of the refrigerant discharged from the turbo compressor increases, and
if the magnetic flux margin degree is below the predetermined value, adjusts at least one of the rotational speed of the turbo compressor and the flow rate of the refrigerant such that the temperature of the refrigerant discharged from the turbo compressor decreases.

6. The system of claim 5, further comprising:
an update section which updates the predetermined operation region, based on an operating state of the turbo compressor at a time when the control section increases the temperature of the refrigerant discharged from the turbo compressor.

7. The system of claim 1, wherein
the load is a turbo compressor which compresses a refrigerant in a refrigerant circuit configured to perform a refrigeration cycle, and
the control section
if the magnetic flux margin degree exceeds a predetermined value, adjusts at least one of a rotational speed of the turbo compressor and a flow rate of the refrigerant such that an output of an air conditioner having the refrigerant circuit decreases, and
if the magnetic flux margin degree is below the predetermined value, adjusts at least one of the rotational speed of the turbo compressor and the flow rate of the refrigerant such that the output of the air conditioner increases.

8. The system of claim 7, further comprising:
an update section which updates the predetermined operation region, based on an operating state of the turbo compressor at a time when the control section decreases the output of the air conditioner.

* * * * *